(12) United States Patent
Ha et al.

(10) Patent No.: US 11,217,636 B2
(45) Date of Patent: Jan. 4, 2022

(54) DISPLAY DEVICE

(71) Applicant: Samsung Display Co., Ltd., Yongin-si (KR)

(72) Inventors: Seung Hwa Ha, Yongin-si (KR); Seung Ho Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/831,461

(22) Filed: Mar. 26, 2020

(65) Prior Publication Data
US 2021/0036069 A1 Feb. 4, 2021

(30) Foreign Application Priority Data

Jul. 30, 2019 (KR) .......................... 10-2019-0092484

(51) Int. Cl.
*H01L 27/32* (2006.01)
*G06F 1/16* (2006.01)
*G06K 9/00* (2006.01)

(52) U.S. Cl.
CPC ........ *H01L 27/3227* (2013.01); *G06F 1/1643* (2013.01); *G06K 9/0002* (2013.01); *H01L 27/323* (2013.01)

(58) Field of Classification Search
CPC ........ G06F 1/16; G06F 1/1637; G06F 1/1643; G06F 1/1652; G06F 3/044; G06K 9/0002; G06K 9/0004; G06K 9/00006; H01L 27/3227; H01L 27/323; G09F 9/00; H05K 1/0278; H05K 1/028; H05K 1/0393; H05K 1/181; H05K 1/189; H05K 2201/09036; H05K 2201/10121; H05K 2201/10128; H05K 2201/10151
See application file for complete search history.

(56) References Cited

U.S. PATENT DOCUMENTS

| 10,123,424 | B1 * | 11/2018 | Lee | H05K 1/0278 |
| 10,796,664 | B2 * | 10/2020 | Zhu | G09G 3/20 |
| 2018/0341290 | A1 | 11/2018 | Sim et al. | |
| 2019/0053377 | A1 | 2/2019 | Lee et al. | |
| 2019/0057267 | A1 | 2/2019 | Kitchens, II et al. | |
| 2019/0197286 | A1 | 6/2019 | Kim et al. | |

FOREIGN PATENT DOCUMENTS

| EP | 3 236 390 A1 | 10/2017 |
| EP | 3 328 039 A1 | 5/2018 |
| EP | 3 605 273 A1 | 2/2020 |
| KR | 10-2018-0130151 A | 12/2018 |

* cited by examiner

*Primary Examiner* — Nelson M Rosario
(74) *Attorney, Agent, or Firm* — Lewis Roca Rothgerber Christie LLP

(57) ABSTRACT

A display device includes a display module. An impact absorption layer is disposed under the display module and includes a first opening exposing a lower surface of the display module. A rigid plate is disposed under the impact absorption layer. A sensor is disposed between the display module and the rigid plate within the first opening and is coupled to an upper surface of the rigid plate. A support member is disposed between the impact absorption layer and the sensor within the first opening, and contacts the display module and the rigid plate.

20 Claims, 21 Drawing Sheets

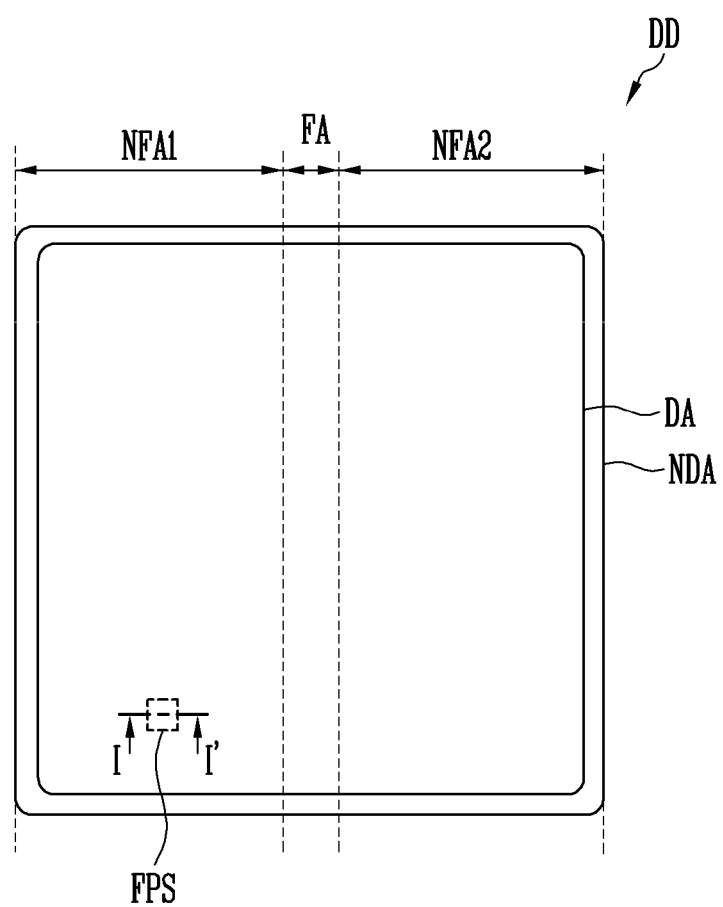

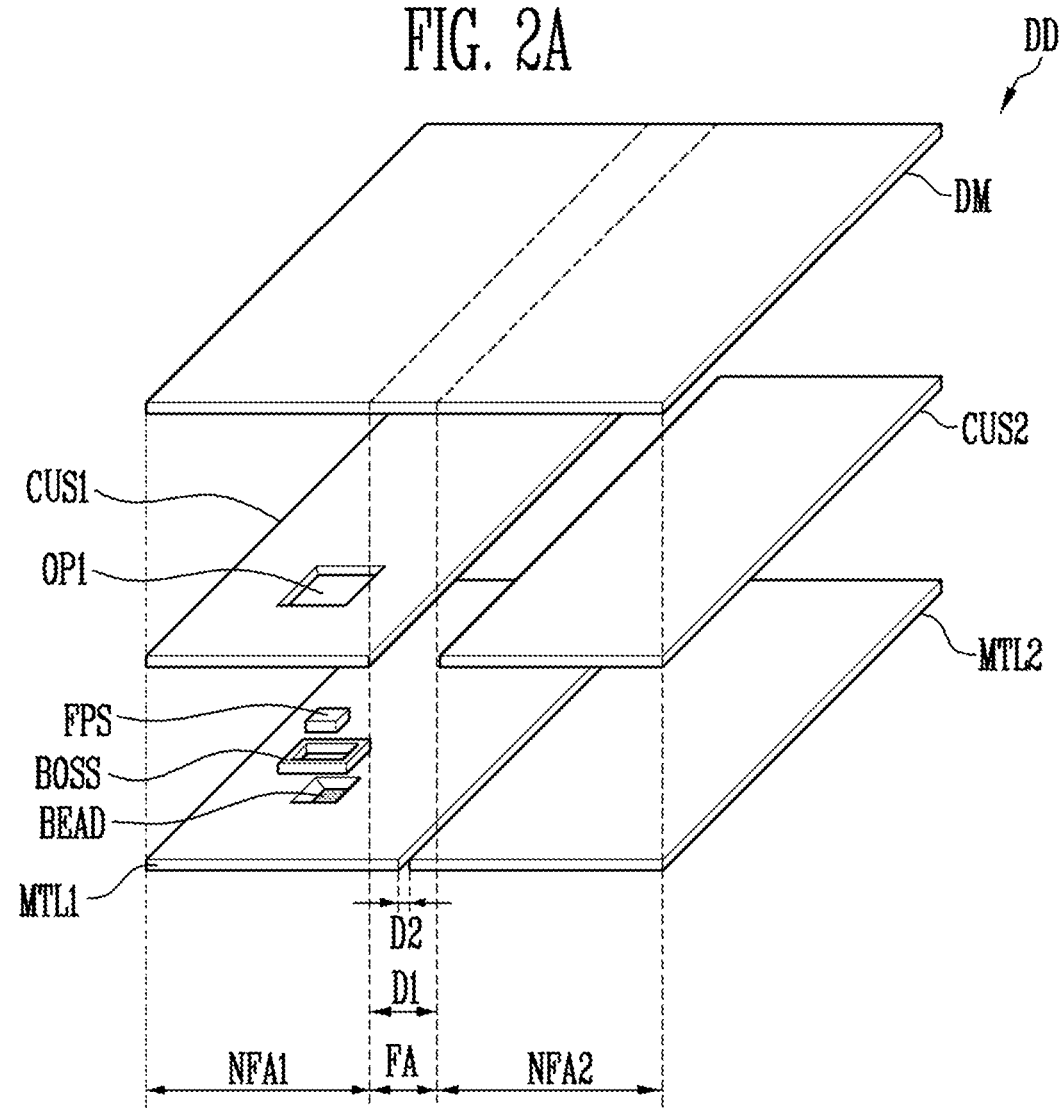

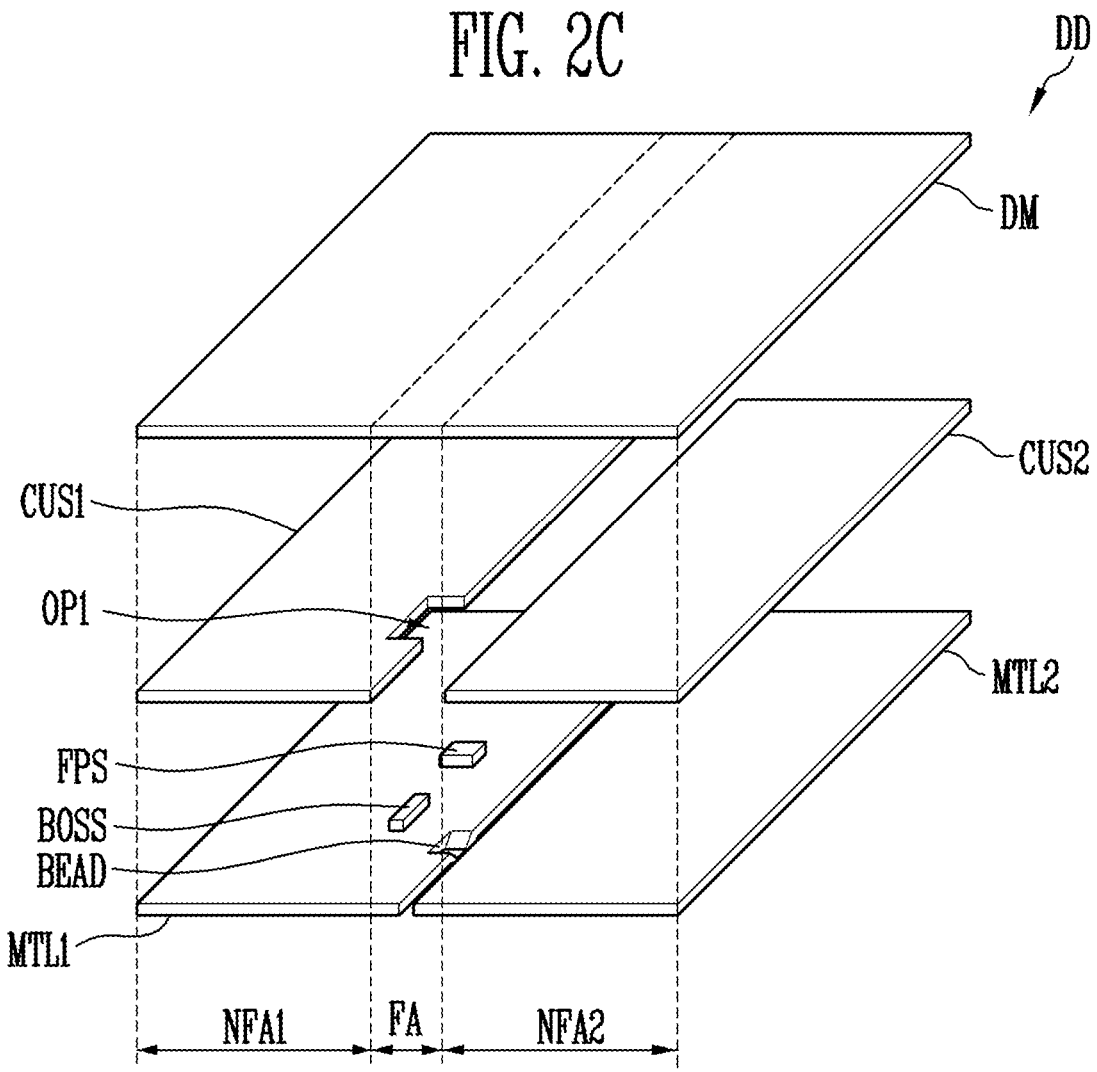

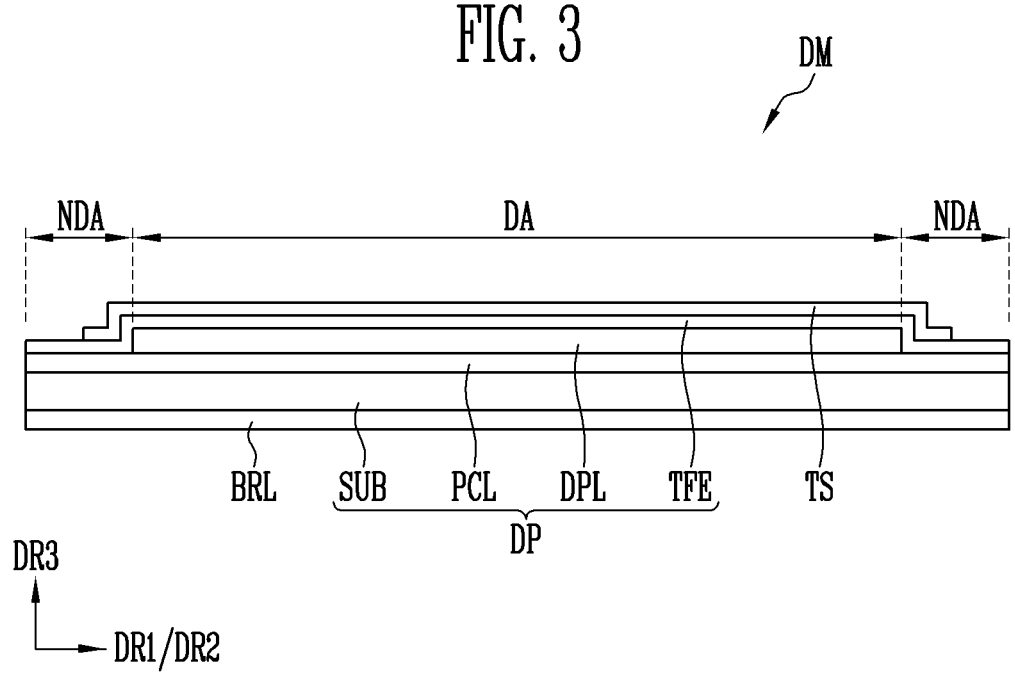

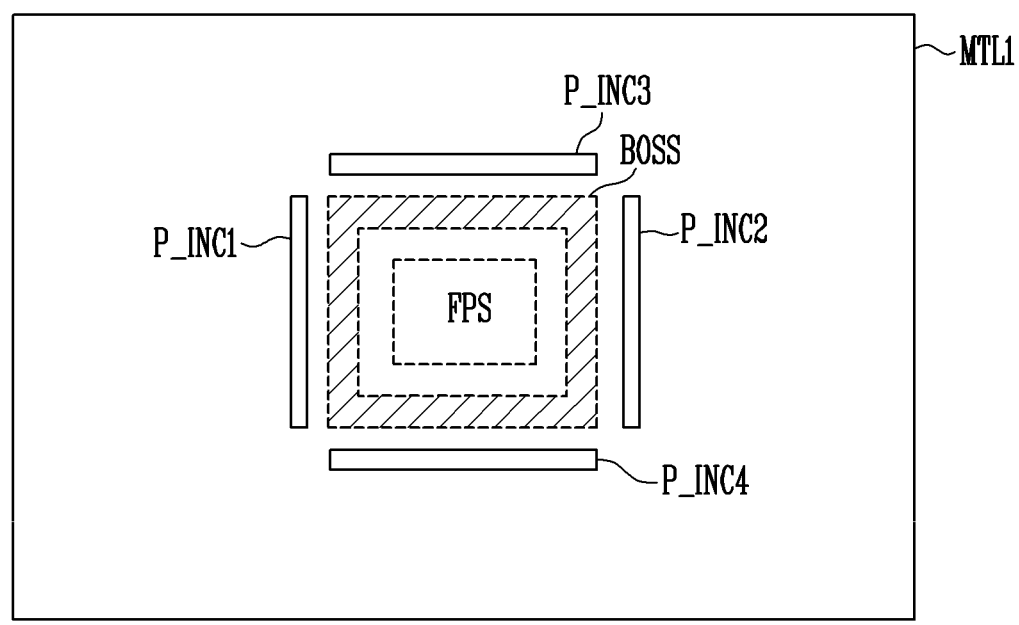

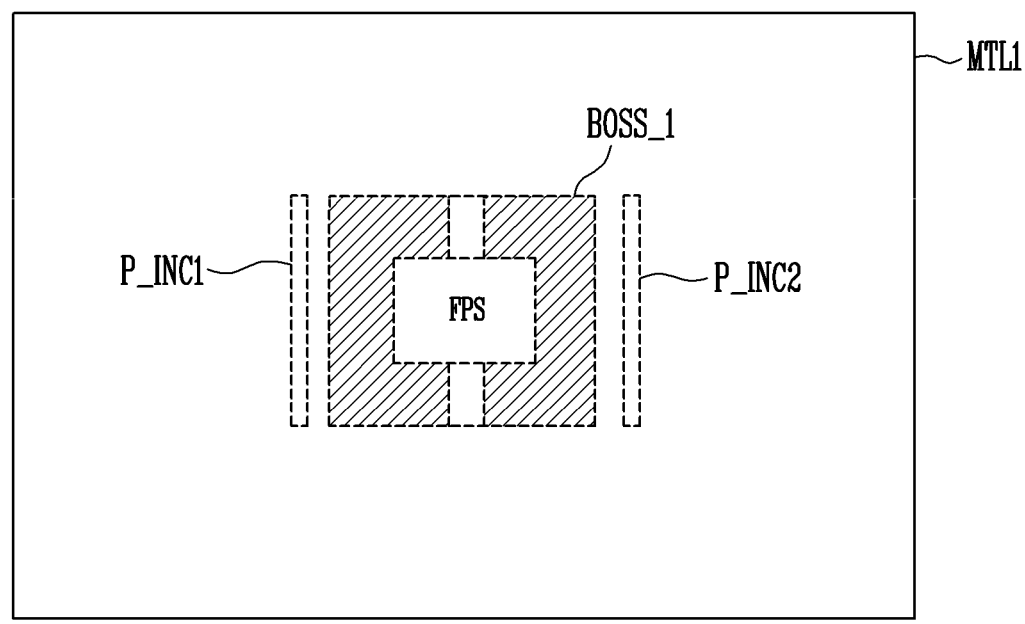

DISPLAY DEVICE

CROSS-REFERENCE TO RELATED APPLICATION

This application claims priority to and the benefit of Korean Patent Application No. 10-2019-0092484 filed in the Korean Intellectual Property Office on Jul. 30, 2019, the entire content of which is incorporated herein by reference.

BACKGROUND

1. Field

One or more aspects of example embodiments of the present disclosure are related to a display device.

2. Description of the Related Art

Biometric information authentication methods using a user's fingerprint and the like have been widely used in display devices (such as smart phones, a tablet PC, and the like) in various fields. Various sensors such as a fingerprint sensor may be embedded in such display devices.

Studies have been performed on strategies to minimize or decrease movement of a fingerprint sensor when fixing (attaching) the fingerprint sensor to a display panel to thereby provide accurate sensing capabilities after fixing the fingerprint sensor.

SUMMARY

One or more aspects of embodiments of the present disclosure are directed toward a display device capable of improving fingerprint sensing ability while minimizing or reducing movement of the fingerprint sensor.

One or more example embodiments of the present disclosure provide a display device including a display module; an impact absorption layer that is disposed under the display module and includes a first opening exposing a lower surface of the display module; a rigid plate that is disposed under the impact absorption layer; a sensor that is disposed between the display module and the rigid plate within the first opening and is coupled to an upper surface of the rigid plate; and a support member that is disposed between the impact absorption layer and the sensor within the first opening, and contacts the display module and the rigid plate, respectively.

According to an example embodiment, the sensor may be spaced apart from the display module.

According to an example embodiment, the support member and the rigid plate may include (e.g., be formed of) the same material.

According to an example embodiment, the support member may have a planar shape of a circular ring or a square ring.

According to an example embodiment, the rigid plate may include a main body part overlapping with the impact absorption layer and a curve part overlapping with the sensor, the curve part may include a flat portion having a height different from a height of the main body part with respect to a surface of the display module, and a connecting portion inclined with the main body part and extending from the main body part to the flat portion, and the support member may contact the main body part.

According to an example embodiment, a thickness of the connecting portion may be less than an average thickness of the main body part.

According to an example embodiment, the rigid plate may include a cutout formed on an outside of the support member with respect to the sensor, and the cutout may overlap the impact absorption layer.

According to an example embodiment, the cutout may have a planar shape corresponding to a planar shape of the support member, and may include a plurality of sub-cutouts separated from each other.

According to an example embodiment, the support member may be around (e.g., surround) at least a portion of the sensor and may include a plurality of sub-support members separated from each other in a plan view, and the sub-cutouts may be formed in correspondence with the sub-support members respectively.

The display device may further include a fixing member disposed between the display module and the sensor, wherein the fixing member includes at least one selected from a thermosetting resin and a photocurable resin.

According to an example embodiment, the display device may further include a fixing member disposed between the display module and the sensor, wherein the fixing member includes at least one selected from polyurethane, for example, thermoplastic polyurethane, silicone, and polydimethylacrylamide.

According to an example embodiment, the support member may include a bottom portion parallel to a lower surface of the display module; and a protruding portion extending downward from an end of the bottom portion, wherein the bottom portion contacts the lower surface of the display module, and the protruding portion is coupled to the rigid plate.

According to an example embodiment, the support member may further include an extending portion extending from a lower end of the protruding portion toward the sensor, wherein the extending portion is in contact with the sensor.

According to an example embodiment, the support member may be manufactured by bending a plate member and may include a recess portion corresponding to a planar shape of the sensor.

According to an example embodiment, the rigid plate may include a cutout formed adjacent to the protruding portion, wherein the cutout overlaps the impact absorption layer.

According to an example embodiment, the rigid plate may include a main body part overlapping with the impact absorption layer and a curve part overlapping with the sensor, the curve part may include a flat portion having a height different from a height of the main body part with respect to a surface of the display module, and a connecting portion inclined with the main body part and extending from the main body part to the flat portion, and the support member may contact the flat portion.

According to an example embodiment, the rigid plate and the support member may be integrally formed.

According to an example embodiment, the sensor may include an ultrasonic wave sensor, a light sensor, and an infrared sensor.

A display device according to an example embodiment of the present disclosure includes a display module that includes first and second non-folding areas and a folding area between the first and second non-folding areas; first and second impact absorption layers that are respectively disposed under the first and second non-folding areas of the display module; a rigid plate that includes first and second sub-rigid plates respectively disposed under the first and second impact absorption layers; a sensor that is disposed between the folding area of the display module and the rigid plate and coupled to an upper surface of the rigid plate; and a support member that is disposed between the first and second impact absorption layers and around the sensor in a plan view.

According to an example embodiment, the rigid plate may include a main body part overlapping with the first and second impact absorption layers and a curve part overlapping with the sensor, the curve part may include a flat portion having a height different from a height of the main body part with respect to a surface of the display module, and a connecting portion inclined with the main body part and extending from the main body part to the flat portion, and the support member may contact the main body part.

According to an example embodiment, the support member may include a first sub-support member disposed between the first impact absorption layer and the sensor; and a second sub-support member disposed between the second impact absorption layer and the sensor.

A display device according to an example embodiment of the present disclosure includes a support member enclosing at least a portion of a fingerprint sensor (or ultrasonic wave sensor) and coupled to a display module and a rigid plate, thereby compensating for a step due to an opening of an impact absorption layer and improving a fingerprint sensing ability of the fingerprint sensor.

BRIEF DESCRIPTION OF THE DRAWINGS

FIGS. 1A and 1B are drawings showing a plan view of a display device according to example embodiments of the present disclosure.

FIG. 2A is an exploded perspective view of the example display device of FIG. 1A.

FIGS. 2B and 2C are exploded perspective views of the example display device of FIG. 1B.

FIG. 3 is a cross-sectional view showing an example of a display module included in the display device of FIG. 2A.

FIGS. 8A to 8C are rear views of an example of the display device of FIG. 7.

FIG. 11C is a rear view showing an example of the display device of FIG. 11A.

DETAILED DESCRIPTION

Figure 1B:
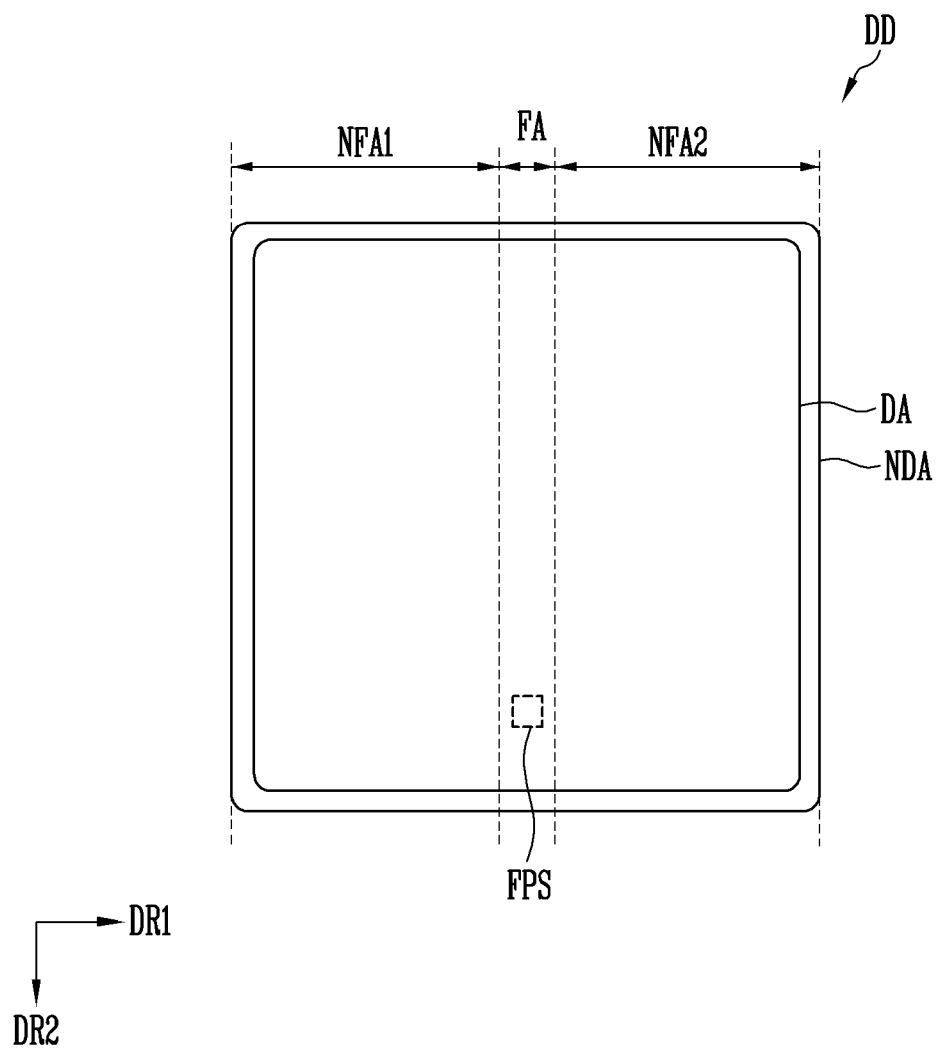

It will be apparent to those skilled in the art that various modifications and variations can be made in the present disclosure without departing from the spirit or scope of the disclosure, and specific example embodiments are exemplified in the drawings and explained in the detailed description. However, the present disclosure is not limited to the example embodiments disclosed hereinafter and can be implemented in various forms.

Selected elements not directly related to the features of the present disclosure may be omitted in the drawing in order to clearly illustrate the present disclosure. In addition, some of the elements in the drawing can be shown in somewhat exaggerated sizes, ratios, and the like. For the same or similar constituent elements throughout drawing, the same reference numerals and symbols are to be used as much as possible even if they are displayed on different drawings, and duplicative descriptions will be omitted. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

FIGS. 1A and 1B are drawings showing a plan view of a display device according to example embodiments of the present disclosure.

First, referring to FIG. 1A, a display device DD may include a display area DA for displaying an image, and a non-display area NDA provided at or around at least one side of the display area DA.

At least a portion of the display device DD may have flexibility (e.g., may be flexible), and the display device DD may be folded at a portion having the flexibility. In the present disclosure, the term "fold" may refer to a state or structure in which the form or physical configuration of the device is not fixed (e.g., in a single set position), and is capable of being transformed from an original form thereof to another form, and may be folded, curved, or rolled along at least one specific line, that is, a folding line (e.g., within or along the portion having the flexibility). For example, the display device DD may be a flexible display device.

In an example embodiment, the display device DD may include first and second non-folding areas NFA1 and NFA2 (or non-foldable areas) and a folding area FA (or foldable area). The first and second non-folding areas NFA1 and NFA2 may not be flexible or may each be a portion having (e.g., capable of) a small degree of bending, e.g., when an external pressure is applied.

The folding area FA may have a specific or set width in a first direction DR1, and may extend perpendicularly in (along) the second direction DR2. The folding area FA may be disposed between the first and second non-folding areas NFA1 and NFA2. The folding area FA may be flexible, may be a portion capable of a large degree of bending when exposed to an external pressure (e.g., force), and can be folded or unfolded. The first and second non-folding areas NFA1 and NFA2 and the folding area FA may be connected to each other or formed integrally, and may be distinguished from each other by their relationship to a rigid plate (e.g., a metal plate disposed on a rear surface of the display device DD to support a structure disposed thereon) described later. For example, the display device DD may be implemented as a foldable display device.

The display device DD may be in-folded (e.g., folded inward) so that the display area DA faces inward, or may be out-folded (e.g., folded outward) so that the display area DA faces outward.

The display device DD may include a plurality of hardware modules for implementing various functions. For example, a pressure sensor for sensing an intensity (or pressure) of a user's touch input and/or a fingerprint sensor FPS for sensing the user's fingerprint may be disposed on the rear surface of the display device DD.

In an example embodiment, the fingerprint sensor FPS may be provided on at least a portion of the first and second non-folding areas NFA1 and NFA2. As shown in FIG. 1A, the fingerprint sensor FPS may be disposed at a lower center portion of the first non-folding area NFA1. For example, when the display device DD is in a folded state, the first non-folding area NFA1 may be exposed to the user, and the fingerprint sensor FPS may be disposed at the lower center portion of the first non-folding area NFA1 exposed to the user.

In an example embodiment, the fingerprint sensor FPS may be provided in the folding area FA. As shown in FIG. 1B, the fingerprint sensor FPS may be disposed at the lower center portion of the folding area FA. For example, when the display device DD is in an unfolded state, the folding area FA may be disposed at a center portion of the display device DD, and the fingerprint sensor FPS may be disposed at the lower center portion of the folding area FA.

For example, the fingerprint sensor FPS may be provided in various suitable locations within the display device DD, and the exact position with respect to the first and second non-folding areas NFA1 and NFA2 and the folding area FA is not limited.

FIG. 2A is an exploded perspective view showing an example of the display device of FIG. 1A.

Referring to FIGS. 1A and 2A, the display device DD may include a display module DM and a cover panel PTL (see label at bottom of drawing).

The display module DM can display an image. In addition, the display module DM may sense an external touch input. For example, the display module DM may include a display panel for displaying an image and a touch panel for sensing a touch input. A more detailed configuration of the display module DM will be described later with reference to FIGS. 3 and 4.

The cover panel PTL (or cover module) may be disposed under the display module DM.

Unless otherwise defined in this specification, the terms "upper" and "upper surface" refer to a side of a display surface normal to a thickness direction (e.g., normal to the third direction DR3) with respect to the display module DM (e.g., facing away from the coordinate origin), and "lower" and "lower surface" refer to an opposite side of the display surface with respect to the display module DM (e.g., facing toward the coordinate origin). In addition, "up", "down", "left", and "right" in a plan view refer directions when the display surface is viewed from above (e.g., as in the plan view of FIG. 1A) in place.

The cover panel PTL may include at least one functional layer. The functional layer may be a layer that is to perform a heat dissipation function, an electromagnetic wave shield function, a ground function, a buffer function, a strength reinforcement function, a support function, an adhesive function, a pressure sensing function, a digitizing function, and/or the like. The functional layer may be a sheet layer made of a sheet, a film layer made of a film, a thin film layer, a coating layer, a panel, a plate, and/or the like. One functional layer may be formed of a single layer, but may also be formed of a stacked plurality of thin film layers or coating layers. The functional layer may be, for example, a support substrate, a heat dissipation layer, an electromagnetic wave shield layer, an impact absorption layer, a bonding layer, a pressure sensor, a digitizer, and/or the like.

In an example embodiment, the cover panel PTL may include an impact absorption layer CUS (or cushion layer) including portions CUS1 and CUS2, and a rigid plate MTL (or metal layer, metal plate) including portions MTL1 and MTL2.

The impact absorption layer CUS may be disposed under the display module DM. The impact absorption layer CUS may be bonded to a lower surface of the display module DM through a separate adhesive layer (e.g. pressure sensitive adhesive PSA).

The impact absorption layer CUS may prevent or reduce an impact from the outside (e.g., lower direction) from being transferred to the display module DM. For example, the impact absorption layer CUS may include polyurethane (PU), thermoplastic polyurethane (TPU), silicon (Si), polydimethylacrylamide (PDMA), and/or the like.

The impact absorption layer CUS may include a first impact absorption layer CUS1 (or first cushion) and a second impact absorption layer CUS2 (or second cushion) separated from each other. The first impact absorption layer CUS1 and the second impact absorption layer CUS2 may be disposed on the same layer and may be spaced apart from each other by a first interval D1 in the first direction DR1. The first interval D1 may be equal to a width of the folding area FA in the first direction DR1, but is not limited thereto.

The first impact absorption layer CUS1 may have an area corresponding to the first non-folding area NFA1, and may be disposed under the display module DM in the first non-folding area NFA1. Similarly, the second impact absorption layer CUS2 may have an area corresponding to the second non-folding area NFA2, and may be disposed under the display module DM in the second non-folding area NFA2. In this case, the first and second non-folding areas NFA1 and NFA2 and the folding area FA may be distinguished by the impact absorption layer CUS (i.e., by overlapping with the impact absorption layer CUS).

In an example embodiment, the first impact absorption layer CUS1 (or impact absorption layer CUS) may include a first opening OP1. The first opening OP1 may expose the display module DM by passing through the first impact absorption layer CUS1, and the first opening OP1 may provide a space in which a support member BOSS described later and the fingerprint sensor FPS are mounted. Because the fingerprint sensing capability of the fingerprint sensor FPS may be degraded or reduced when the first impact absorption layer CUS1 overlaps with the fingerprint sensor FPS, the first opening OP1 may be formed in the first impact absorption layer CUS1.

The impact absorption layer CUS is shown as not being disposed in the folding area FA in FIG. 2A, but is not limited thereto. In some embodiments, for example, the impact absorption layer CUS may also be disposed in the folding area FA.

The rigid plate MTL may be disposed under the impact absorption layer CUS and may be bonded to the impact absorption layer CUS through a separate adhesive layer. The rigid plate MTL may be formed of a metallic material such as stainless steel (SUS), a polymer such as polymethyl methacrylate (PMMA), polycarbonate (PC), polyvinyl alcohol (PVA), acrylonitrile-butadiene-styrene (ABS), polyethylene terephthalate (PET), and/or the like. The rigid plate MTL may reduce a degree of bending of the display module DM when exposed to an external force, and may maintain the display module DM in a relatively flat state.

The rigid plate MTL may include a first rigid plate MTL1 (or first metal plate) and a second rigid plate MTL2 (or second metal plate) separated from each other. The first rigid plate MTL1 and the second rigid plate MTL2 may be spaced apart from each other by a second interval D2 in the first direction DR1, and the second interval D2 may be less than the first interval D1 (or width of the folding area FA).

The first rigid plate MTL1 and the second rigid plate MTL2 are shown to be spaced apart from each other in FIG. 2A, but embodiments or spacings of the first rigid plate MTL1 and the second rigid plate MTL2 are not limited thereto because FIG. 2A is only an example for clarifying that the first rigid plate MTL1 and the second rigid plate MTL2 are distinguished (distinct) from each other (e.g., are two separate pieces). In some embodiments, for example, the second interval D2 may be substantially zero, and the first rigid plate MTL1 and the second rigid plate MTL2 may be disposed contacting each other.

The first rigid plate MTL1 may be bonded to the first impact absorption layer CUS1 through an adhesive layer, and the second rigid plate MTL2 may be bonded to the second impact absorption layer CUS2 through an adhesive layer.

The non-folding areas NFA1 and NFA2 and the folding area FA may be defined or set (e.g., formed) by coupling between the display module DM, the impact absorption layer CUS, and the rigid plate MTL. The first non-folding area NFA1 may be an area in which the display module DM, the first impact absorption layer CUS1, and the first rigid plate MTL1 are coupled in the third direction DR3 through the adhesive layers. Similarly, the second non-folding area NFA2 may be an area in which the display module DM, the second impact absorption layer CUS2, and the second rigid plate MTL2 are coupled in the third direction DR3 through the adhesive layers. The folding area FA may be an area in which the display module DM is not coupled to the rigid plate MTL directly or indirectly.

In an example embodiment, the first rigid plate MTL1 (or rigid plate MTL) may include a curve part (portion) BEAD (or bending part, depression part), corresponding to a first opening OP1 of the first impact absorption layer CUS1. The curve part BEAD may be a part of the first rigid plate MTL1 that is bent or curved so that the first rigid plate MTL1 protrudes convexly in a downward direction, and may provide a space (e.g., a space formed by recessing an upper surface of the first rigid plate MTL1) in which the support member BOSS and the fingerprint sensor FPS are mounted on the upper surface of the first rigid plate MTL1.

In example embodiments, the cover panel PTL may further include a support member BOSS.

The support member BOSS may be provided in a space formed by the first opening OP1 of the first impact absorption layer CUS1 and the curve part BEAD of the first rigid plate MTL1. The support member BOSS may be disposed between the first impact absorption layer CUS1 and the fingerprint sensor FPS within the first opening OP1. The support member BOSS may be bonded to the lower surface of the display module DM through an adhesive layer, and may be bonded to the upper surface of the first rigid plate MTL1 (or curve part BEAD) through an adhesive layer. However, embodiments are not limited thereto. For example, the support member BOSS may be directly bonded to the upper surface of the first rigid plate MTL1 through thermal pressurization, and for example, may contact but not be bonded to the lower surface of the display module DM. The support member BOSS may support at least a portion of some areas (e.g., sensor arrangement area) of the display module DM corresponding to the first opening OP1 of the first impact absorption layer CUS1.

The support member BOSS may be formed of a metallic material such as stainless steel (SUS), a polymer such as polymethyl metacrylate (PMMA), polycarbonate (PC), polyvinyl alcohol (PVA), acrylonitrile-butadiene-styrene (ABS), polyethylene terephthalate (PET), and the like. The support member BOSS may include (e.g., be formed of) the same material as a material included in the rigid plate MTL.

Figure 2B:
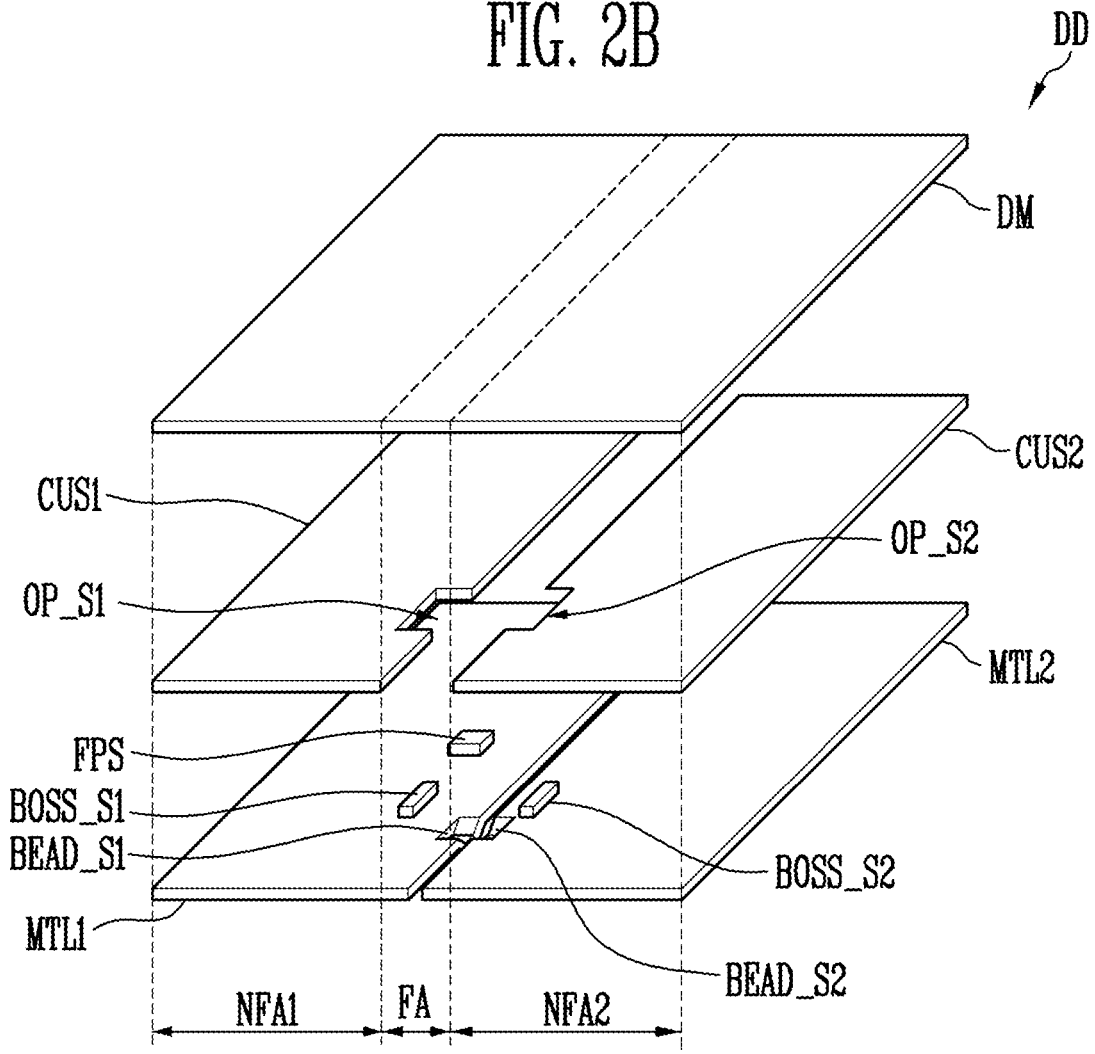

In an example embodiment, the support member BOSS may have a shape of a cylinder or polygonal pillar (e.g. square pillar) and may include a second opening (e.g., an internal through-hole or cavity). For example, the support member BOSS may have a pipe shape, a ring shape, or a donut shape. However, embodiments are not limited thereto. For example, as shown in FIG. 2B, the support member BOSS may include sub-support members BOSS_S1 and BOSS_S2 spaced apart from each other by an interval corresponding to the second opening.

The fingerprint sensor FPS may be provided in a space formed by (e.g., between the confluence of) the first opening OP1 of the first impact absorption layer CUS1, the curve part BEAD of the first rigid plate MTL1, and the second opening of the support member BOSS. The support member BOSS may be disposed within the first opening OP1 of the first impact absorption layer CUS1 and the curve part BEAD of the first rigid plate MTL1, the fingerprint sensor FPS may be disposed in the second opening of the support member BOSS, and the fingerprint sensor FPS may be bonded to the upper surface of the first rigid plate MTL1 (and/or to the curve part BEAD) through a separate adhesive layer.

The fingerprint sensor FPS may be a sensing element that recognizes (e.g., received input from) a user's fingerprint. The fingerprint sensor FPS may be connected to a fingerprint sensor driver (e.g., a flexible circuit board disposed under the first rigid plate MTL1 within the first non-folding area NFA1) through a separate line, a flexible printed circuit substrate, a tape carrier package, a connector, a chip-on film, and/or the like.

The fingerprint sensor FPS may be a light sensing type sensor (e.g., light sensor), an infrared sensor, or an ultrasonic wave sensing type sensor (e.g., ultrasonic wave sensor).

In example embodiments, the fingerprint sensor FPS may be an ultrasonic wave sensing type sensor. The fingerprint sensor FPS may emit an ultrasonic wave signal to a user's finger contacting the display module DM, and may receive a return ultrasonic wave signal, the intensity of which may vary depending on whether a point on the user's fingerprint corresponds to a ridge or a valley, thereby enabling detecting and recognition of the user's fingerprint. The fingerprint sensor FPS may recognize the user's fingerprint not only when the user's finger contacts the display module DM, but also when the user's finger is moved in a contacted state.

As described referring to FIG. 2A, the support member BOSS may be disposed in the first opening OP1 of the first impact absorption layer CUS1 and the curve part BEAD of the first rigid plate MTL1, and the support member BOSS may support at least a portion (e.g., sensor arrangement area) of the display module DM corresponding to the first opening OP1 of the first impact absorption layer CUS1. In addition, the fingerprint sensor FPS may be disposed in the second opening of the support member BOSS, the fingerprint sensor FPS may be coupled to the first rigid plate MTL1 (or curve part BEAD), and may be supported by the first rigid plate MTL1.

The fingerprint sensor FPS is shown to be disposed within the support member BOSS having a shape of a square ring in the first non-folding area NFA1 in FIG. 2A, but is not limited thereto.

FIGS. 2B and 2C are exploded perspective views showing an example of the display device of FIG. 1B.

Referring to FIGS. 2A to 2C, because the display devices DD of FIGS. 2B and 2C are substantially equivalent or similar to the display device DD of FIG. 2A except for the disposition of the fingerprint sensor FPS, duplicative descriptions will not be provided.

As shown in FIG. 2B, the first impact absorption layer CUS1 may include a first sub-opening OP_S1 (or first cutout, first recess portion). The first sub-opening OP_S1 may be formed at one side of the first impact absorption layer CUS1 adjacent to the folding area FA. Similarly, the second impact absorption layer CUS2 may include a second sub-opening OP_S2 (or second cutout, second recess portion), and the second sub-opening OP_S2 may be formed at one side of the second impact absorption layer CUS2 adjacent to the folding area FA. The first sub-opening OP_S1 and the second sub-opening OP_S2 may form a space (e.g., a space in which the support member BOSS and the fingerprint sensor FPS are disposed) corresponding to the space formed by the first opening OP1 of FIG. 2A.

The first rigid plate MTL1 may include a first curve part BEAD_S1 corresponding to the first sub-opening OP_S1 of the first impact absorption layer CUS1, and the second rigid plate MTL2 may include a second curve part BEAD_S2 corresponding to the second sub-opening OP_S2 of the second impact absorption layer CUS2. The first curve part BEAD_S1 and the second curve part BEAD_S2 may together form a space (i.e., a space in which the fingerprint sensor FPS is disposed) corresponding to the space formed by the curve part BEAD of FIG. 2A.

The support member BOSS may include first and second sub-support members BOSS_S1 and BOSS_S2 spaced apart from each other in the first direction DR1.

Each of the first and second sub-support members BOSS_S1 and BOSS_S2 may have a shape of a polygonal pillar, and a length of the first and second sub-support members BOSS_S1 and BOSS_S2 in the second direction DR2 may be greater than a width in the first direction DR1, but are not limited thereto.

The first and second sub-support members BOSS_S1 and BOSS_S2 may be spaced apart from each other to form the space corresponding to the second opening of the support member BOSS described with reference to FIG. 2A.

Meanwhile, the first and second impact absorption layers CUS1 and CUS2 are described as including the first and second sub-openings OP_S1 and OP_S2 in FIG. 2B, respectively, but are not limited thereto.

Referring to FIG. 2C, in some embodiments, only the first impact absorption layer CUS1 may include the first opening OP1 corresponding to the first sub-opening OP_S1 (see FIG. 2B), and the second impact absorption layer CUS2 may not include a sub-opening.

In some embodiments, only the first rigid plate MTL1 may include the curve part BEAD corresponding to the first opening OP1 of the first impact absorption layer CUS1, and the second rigid plate MTL2 may not include a curve part.

In addition, the support member BOSS corresponding to the first sub-support member BOSS_S1 (see FIG. 2B) may be disposed only on the first rigid plate MTL1.

For example, the width of the folding area FA may be relatively large, the fingerprint sensor FPS (and the support member BOSS) may be relatively small, or the fingerprint sensor FPS may be disposed to be biased to one side (e.g., toward the first non-folding area NFA1) within the folding area FA. In this case, only one selected from the first impact absorption layer CUS1 and the second impact absorption layer CUS2 may include the sub-opening, or the first impact absorption layer CUS1 and the second impact absorption layer CUS2 may not include the sub-opening. Similarly, only one selected from the first rigid plate MTL1 and the second rigid plate MTL2 may include the curve part.

Only a shape of the support member BOSS and a shape of the curve part BEAD of the rigid plate MTL may be partially changed according to a disposition (e.g., in first non-folding area NFA1, folding area FA) of the fingerprint sensor FPS. However, a disposition relationship and a coupling relationship between the support member BOSS, the curve part BEAD, and the fingerprint sensor FPS may be substantially the same. Therefore, a description will be given with respect to a display device DD in which the fingerprint sensor FPS is disposed in the first non-folding area NFA1.

FIG. 3 is a cross-sectional view showing an example of a display module included in a display device of FIG. 2A.

Referring to FIGS. 2A and 3, the display module DM may include a display panel DP and a touch sensor TS.

The touch sensor TS may be directly disposed on the display panel DP. In the present disclosure, "directly disposed" describes that the touch sensor TS is formed by a continuous process, and attached without using a separate adhesive layer (e.g., with no additional parts between the touch sensor TS and display panel DP). However, the present disclosure is not limited thereto, and in some embodiments another layer such as an adhesive layer, a substrate, and the like may be disposed between the display panel DP and the touch sensor TS.

The display panel DP may display arbitrary (any suitable) visual information, for example, a text, a video, a photograph, a two-dimensional or three-dimensional image, and the like. Hereinafter, arbitrary visual information is called an "image". The display panels DP may be any suitable display panel, such as an organic light emitting diode display panel, a liquid crystal display panel, a plasma display panel, an electrophoretic display panel, an electrowetting display panel, a quantum dot light emitting display panel, and a micro light emitting diode (LED) display panel. In the example embodiment, an organic light emitting diode display panel is applied as the display panel DP.

The display panel DP may include a substrate SUB, a pixel circuit layer PCL provided on the substrate SUB, a light emitting element layer DPL provided on the pixel circuit layer PCL, and a thin film encapsulation layer TFE provided on the light emitting element layer DPL.

The substrate SUB may be formed of an insulation material such as glass, resin, and/or the like. In addition, the substrate SUB may be formed of a flexible material to be bent or folded, and may have a single layer structure or a multiple layer structure. For example, the flexible material may include at least one selected from the group consisting of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material constituting the substrate SUB may be suitably changed, and may also be made of a fiber glass reinforced plastic (FRP). In an example embodiment of the present disclosure, the substrate SUB may be formed of a flexible material.

The pixel circuit layer PCL may include a plurality of insulation layers, a plurality of conductive layers, and a semiconductor layer. The conductive layers may form signal lines or a pixel driving circuit.

The light emitting element layer DPL may include a light emitting (light emitter) element to emit light.

The thin film encapsulation layer TFE may seal the light emitting element layer DPL. The thin film encapsulation layer TFE may be formed of a single layer, but may be formed of multiple layers. The thin film encapsulation layer TFE may include a plurality of insulation layers covering the light emitting element. The thin film encapsulation layer TFE may include at least one inorganic layer and at least one organic layer. For example, the thin film encapsulation layer TFE may have a structure in which an inorganic layer and an organic layer are alternately stacked. In some cases, the thin film encapsulation layer TFE may be an encapsulation substrate that is disposed on the light emitting element layer DPL and bonded to the substrate SUB through a sealant.

The touch sensor TS may be disposed on a surface from which the image is emitted in the display panel DP to sense a user's touch input. The touch sensor TS may recognize a touch event of the display device DD through a user's hand or a separate input means. In some embodiments, for example, the touch sensor TS may recognize a touch event in a capacitance manner (e.g., the touch sensor TS may be a capacitive touch sensor).

The touch sensor TS may include a plurality of touch electrodes and a plurality of sensing lines. The touch electrodes and the sensing lines may have a single layer structure or a multiple layer structure.

The touch electrodes and the sensing lines may include indium tin oxide (ITO), indium zinc oxide (IZO), zinc oxide (ZnO), indium tin zinc oxide (ITZO), PEDOT, a metal nanowire, and/or graphene. The touch electrodes and the sensing lines may include a metal layer, for example molybdenum, silver, titanium, copper, aluminum, and/or one or more alloys thereof. The touch electrodes and the sensing lines may have the same layer structure or different layer structures.

In some embodiments, a window for protecting the exposed surface of the display module DM may be provided on the display module DM. The window may protect the display module from external impacts and provide an input surface and/or a display surface to the user. The window may be bonded to the display module DM through an optically transparent adhesive member.

In some embodiments, the window may have a multiple layer structure formed of at least one selected from a glass substrate, a plastic film, and a plastic substrate. Such a multiple layer structure may be formed through a continuous process or an adhesive process using one or more adhesive layers. All or a portion of the window may be flexible.

In some embodiments, the display module DM may further include a protective layer BRL. The protective layer BRL may be provided or formed on a lower surface of the display panel DP, for example, a surface on which the touch sensor TS is not disposed. The protective layer BRL may protect the display panel DP by absorbing and/or dispersing an external impact applied to the display panel DP. In addition, the protective layer BRL may prevent or reduce external oxygen and moisture from entering the display panel DP.

The protective layer BRL may be formed as a plastic film including at least one organic layer. The plastic film may be formed of at least one thermoplastic polymer resin such as polycarbonate (PC), polyimide (PI), polyethersulfone (PES), polyarylate (PAR), polyethylene naphthalate (PEN), polyethylene terephthalate (PET), cyclo-olefin copolymers, and/or the like having high transparency and excellent thermal insulation properties, and at least one thermosetting polymer resin such as epoxy, unsaturated polyester, phenol (PF), silicone, polyurethane, and the like. In example embodiments of the present disclosure, the protective layer BRL is not limited to the materials described above, and may be manufactured using any material suitable for the display conditions of the display panel DP, among materials capable of protecting the substrate SUB disposed thereon.

The protective layer BRL may be formed as a film to further secure the flexibility of the display module DM. In addition, an adhesive layer (e.g., a pressure-sensitive adhesive layer) may be provided between the display panel DP and the protective layer BRL to firmly bond the display panel DP and the protective layer BRL.

Figure 4:
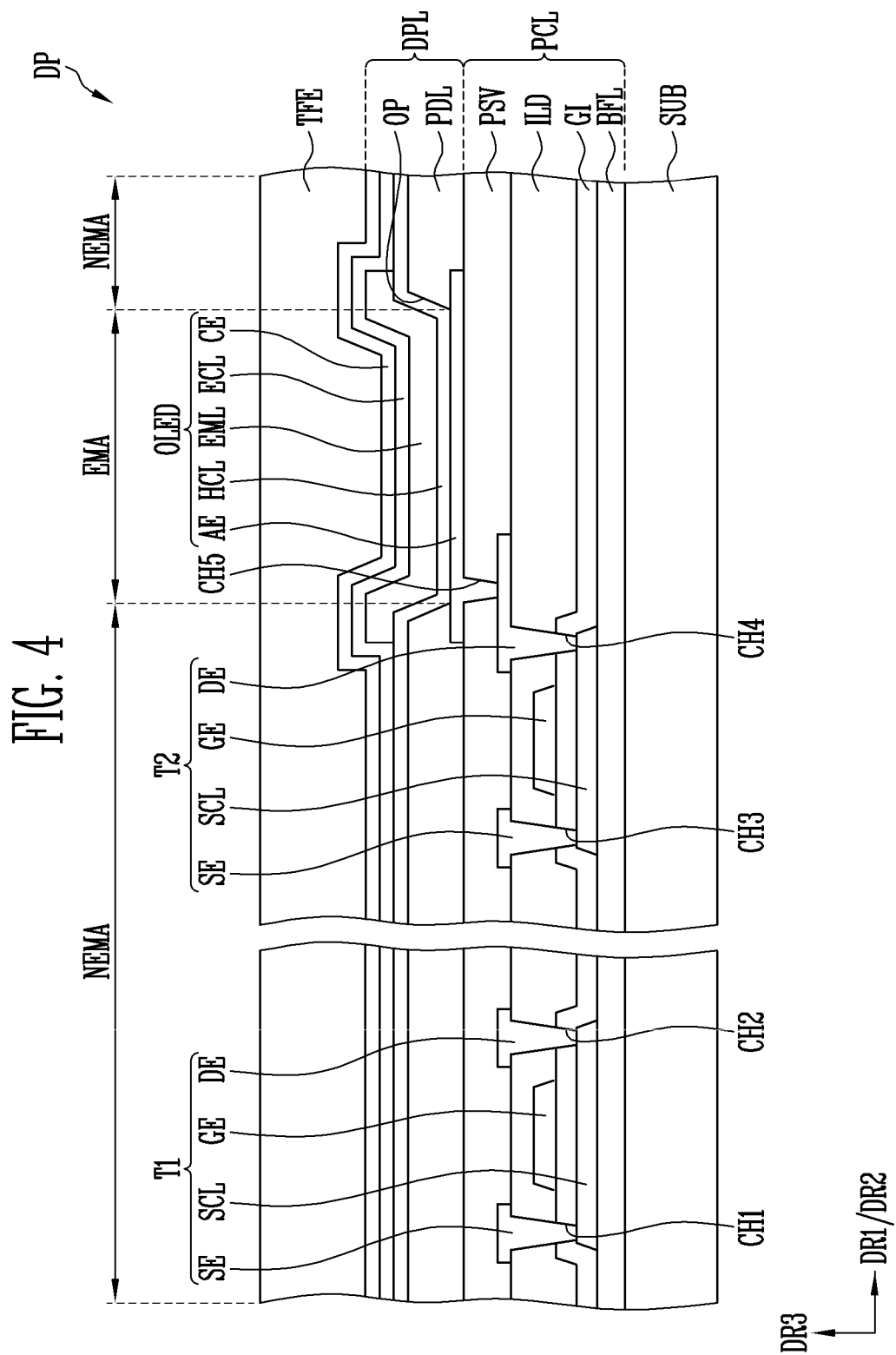
FIG. 4 is a cross-sectional view showing an example of a display panel included in the display module of FIG. 3.

FIG. 4 is a cross-sectional view showing an example of a display panel included in the display module of FIG. 3.

Referring to FIGS. 3 and 4, the pixel circuit layer PCL may include a buffer layer BFL, first and second transistors T1 and T2, an interlayer insulation layer ILD, a gate insulation layer GI and a passivation layer PSV.

The first transistor T1 shown in FIG. 4 may directly or indirectly transfer a data signal to the second transistor T2 in response to an externally provided scan signal, and the second transistor T2 may provide a driving current to a light emitting element OLED in response to the transferred data signal.

The buffer layer BFL may be provided on the substrate SUB and may prevent or reduce impurities from diffusing into the first and second transistors T1 and T2. The buffer layer BFL may be provided as a single layer, or in some embodiments may be provided as multiple layers of at least double layers. In some embodiments, the buffer layer BFL may be omitted according to a material and a process condition of the substrate SUB.

Each of the first and second transistors T1 and T2 may include a semiconductor layer SCL, a gate electrode GE, a source electrode SE, and a drain electrode DE.

The semiconductor layer SCL of each of the first and second transistors T1 and T2 may be provided on the buffer layer BFL. The semiconductor layer SCL may include first and second regions contacting the source electrode SE and the drain electrode DE, respectively. A region between the first region and the second region may be a channel region. In an example embodiment of the present disclosure, the first region may be one selected from the source region and the drain region, and the second region may be the other region.

The semiconductor layer SCL may be a semiconductor pattern formed of polysilicon, amorphous silicon, oxide semiconductor, and/or the like. In some embodiments, the channel region may be an intrinsic semiconductor pattern that is not doped with an impurity. In this case, any suitable impurity such as an n-type impurity, a p-type impurity, or other metal may be used. The first and second regions may be semiconductor patterns doped with impurities.

The gate electrode GE of each of the first and second transistors T1 and T2 may be provided on a corresponding semiconductor layer SCL with a gate insulation layer GI therebetween.

The source electrode SE of each of the first and second transistors T1 and T2 may contact one selected from the first region and the second region of the corresponding semiconductor layer SCL through a contact hole passing through the interlayer insulation layer ILD and the gate insulation layer GI. For example, the source electrode SE of the first transistor T1 may contact the first region of the corresponding semiconductor layer SCL through a first contact hole CH1 passing through the interlayer insulation layer ILD and the gate insulation layer GI, and the source electrode SE of the second transistor T2 may contact the first region of the corresponding semiconductor layer SCL through a third contact hole CH3 passing through the interlayer insulation layer ILD and the gate insulation layer GI.

The drain electrode DE of each of the first and second transistors T1 and T2 may contact the other of the first and second regions of the corresponding semiconductor layer SCL through a contact hole passing through the interlayer insulation layer ILD and the gate insulation layer GI. For example, the drain electrode DE of the first transistor T1 may contact the second region of the corresponding semiconductor layer SCL through a second contact hole CH2 passing through the interlayer insulation layer ILD and the gate insulation layer GI, and the drain electrode DE of the second transistor T2 may contact the second region of the corresponding semiconductor layer SCL through a fourth contact hole CH4 passing through the interlayer insulation layer ILD and the gate insulation layer GI.

The source electrode SE and the drain electrode DE of each of the first and second transistors T1 and T2 are described as separate electrodes electrically connected to the semiconductor layer SCL, but the present disclosure is not limited thereto. According to an example embodiment, the source electrode SE of each of the first and second transistors T1 and T2 may be one selected from the first and second regions adjacent to the channel region of each semiconductor layer SCL, and the drain electrode DE of each of the first and second transistors T1 and T2 may be the other of the first and second regions adjacent to the channel region of each semiconductor layer SCL. In this case, the drain electrode DE of the second transistor T2 may be electrically connected to the first electrode AE of the light emitting element OLED through a bridge electrode or a contact electrode.

Each of the interlayer insulation layer ILD and the gate insulation layer GI may be formed of an inorganic insulation layer including an inorganic material or an organic insulation layer including an organic material.

The passivation layer PSV may be provided on the first and second transistors T1 and T2 to cover the first and second transistors T1 and T2. The passivation layer PSV may include a fifth contact hole CH5 exposing a portion of the drain electrode DE of the second transistor T2 to the outside.

The light emitting element layer DPL may be provided on the passivation layer PSV and may include a light emitting element OLED emitting light.

The light emitting element OLED may include first and second electrodes AE and CE and an emission layer EML provided between the two electrodes AE and CE. Here, one selected from the first and second electrodes AE and CE may be an anode, and the other may be a cathode. When the light emitting element OLED is an organic light emitting element of a front light emitting type (e.g., emits light in a direction toward the second electrode CE, along the third direction DR3), the first electrode AE may be a reflective electrode, and the second electrode CE may be a transmissive electrode. Thereinafter, a case in which the light emitting element OLED is an organic light emitting element of the front light emitting type and the first electrode AE is an anode will be described as an example.

The first electrode AE may be electrically connected to the drain electrode DE of the second transistor T2 through the fifth contact hole CH5 passing through the passivation layer PSV. The first electrode AE may include a reflective layer capable of reflecting light and a transparent conductive layer disposed up or down the reflective layer. At least one selected from the transparent conductive layer and the reflective layer may be electrically connected to the drain electrode DE of the second transistor T2.

The light emitting element layer DPL may further include a pixel definition layer PDL having an opening OP exposing a portion of the first electrode AE, for example, an upper surface of the first electrode AE.

Each of the pixels provided in the display panel DP may be disposed in a pixel area in a plan view. In an example embodiment of the present disclosure, the pixel area may include a light emitting area EMA and a non-light emitting area NEMA adjacent to the light emitting area EMA. The non-light emitting area NEMA may be around (e.g., surround) the light emitting area EMA. In an example embodiment of the present disclosure, the light emitting area EMA may be defined as corresponding to a portion of the first electrode AE exposed by the opening OP.

The light emitting element OLED may include a hole control layer HCL and an electron control layer ECL.

The hole control layer HCL may be commonly disposed in the light emitting area EMA and the non-light emitting area NEMA. A common layer such as a hole control layer HCL may be commonly formed in a plurality of pixels.

The emission layer EML may be disposed on the hole control layer HCL. The emission layer EML may be disposed in an area corresponding to the opening OP. For example, the emission layer EML may be provided separately in each of a plurality of pixels. The emission layer EML may include an organic material and/or an inorganic material. In the example embodiment of the present disclosure, the patterned emission layer EML is shown as an example, but the emission layer EML may be commonly provided to the pixels according to the example embodiment. A color of light generated in the emission layer EML may be one selected from red, green, blue, and white, but the example embodiment of the present disclosure is not limited thereto. For example, the color of light generated by the emission layer EML may be one selected from magenta, cyan, and yellow.

The electron control layer ECL may be provided on the emission layer EML. The electron control layer ECL may be commonly formed in the pixels, and may play a role of injecting and/or transferring electrons to the emission layer EML.

The second electrode CE may be provided on the electron control layer ECL. The second electrode CE may be commonly provided to the pixels.

The thin film encapsulation layer TFE covering the second electrode CE may be provided on the second electrode CE.

The thin film encapsulation layer TFE may be formed of a single layer, and in some embodiments may be formed of multiple layers. The thin film encapsulation layer TFE may include a plurality of insulation layers covering the light emitting element OLED. In more detail, the thin film encapsulation layer TFE may include at least one inorganic layer and at least one organic layer. For example, the thin film encapsulation layer TFE may have a structure in which an inorganic film and an organic film are alternately stacked.

Figure 5:
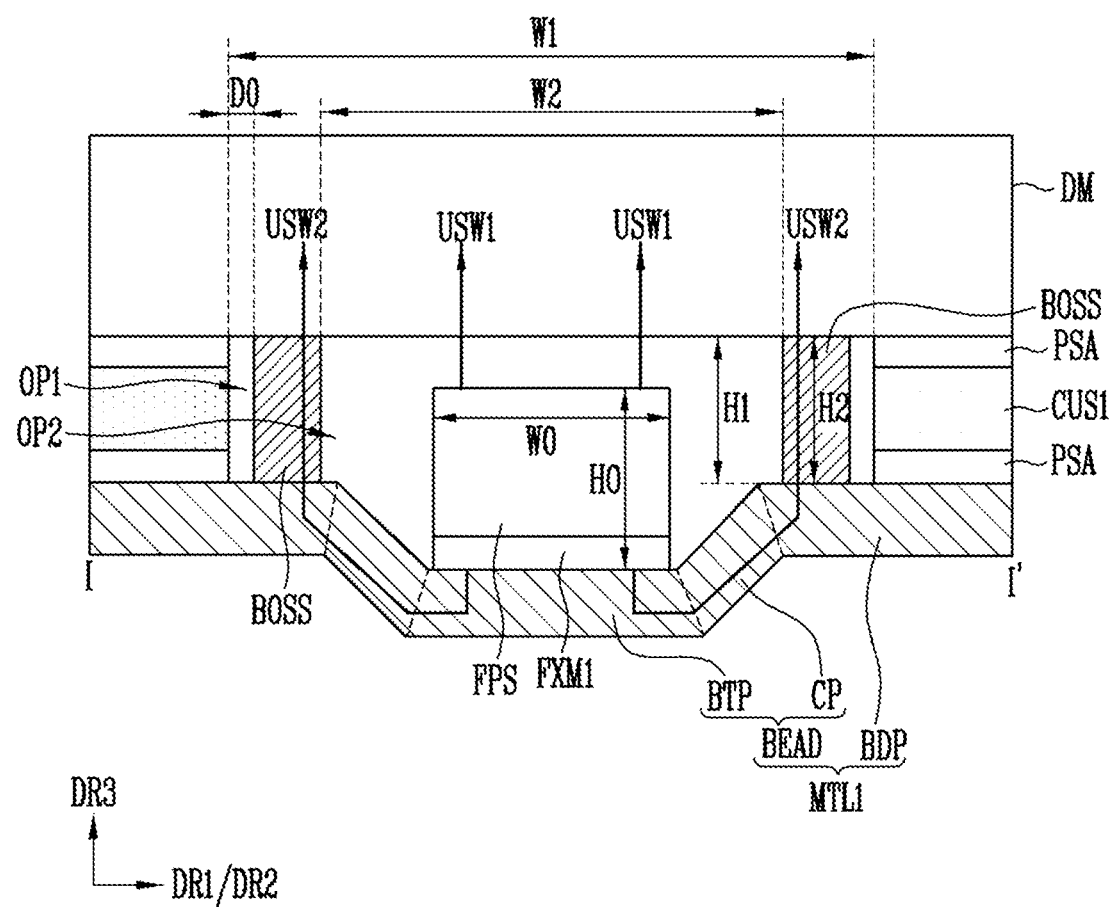
FIG. 5 is a cross-sectional view showing an example of a display device as viewed along line I-I' in FIG. 1A.

FIG. 5 is a cross-sectional view showing an example of a display device taken along line I-I' of FIG. 1A.

Referring to FIGS. 1A, 2A, and 5, the first impact absorption layer CUS1 may be disposed under the display module DM, and the first impact absorption layer CUS1 may be bonded to the lower surface of the display module DM through an adhesive layer PSA. The adhesive layer PSA may be a pressure-sensitive adhesive film, and may include an opening corresponding to the first opening OP1 of the first impact absorption layer CUS1.

The first rigid plate MTL1 may be disposed under the first impact absorption layer CUS1, and the first rigid plate MTL1 may be bonded to the first impact absorption layer CUS1 through the adhesive layer PSA.

The first rigid plate MTL1 may include a main body part BDP and a curve part BEAD, and the curve part BEAD may overlap with the fingerprint sensor FPS and include the flat portion BTP and connecting portion CP (or, inclined portion).

The main body part BDP may have a set or predetermined thickness, may have a generally flat surface, and may constitute most of (e.g., the surface area or width of) the first rigid plate MTL1. The main body part BDP may overlap with the first impact absorption layer CUS1.

The flat portion BTP may have a generally flat surface, and may have a height (or vertical position) that is different from a height of the main body part BDP, for example, a distance that the flat portion BTP is spaced apart from (e.g., below) the lower surface of the display module DM may be greater than a distance that the body part BDP is spaced apart from (e.g., below) the lower surface of the display module DM.

The flat portion BTP may have an area equal to or greater than that of the fingerprint sensor FPS in a plan view. In this case, the fingerprint sensor FPS may be fully coupled to and supported by the flat portion BTP.

The connecting portion CP may extend from an boundary of the main body part BDP to the flat portion BTP with a set or predetermined inclination, and may connect the main body part BDP and the flat portion BTP.

The main body part BDP, the flat portion BTP and the connecting portion CP may be integrally formed (e.g., as a single continuous piece).

In an example embodiment, a thickness (or average thickness) of the connecting portion CP (or curve part BEAD) may be less than a thickness of the main body part BDP. The curve part BEAD may be formed by extending a portion of the first rigid plate MTL1 through a forging process, and then, a thickness of the connecting portion CP may be less than a thickness of the main body part BDP.

The support member BOSS may be disposed between the display module DM and the first rigid plate MTL1 within the first opening OP1 of the first impact absorption layer CUS1.

A thickness H2 of the support member BOSS may be equal to a thickness of the first impact absorption layer CUS1 (or a total thickness H1 of the first impact absorption layer CUS1 and the adhesion layer PSA).

Figure 6A:
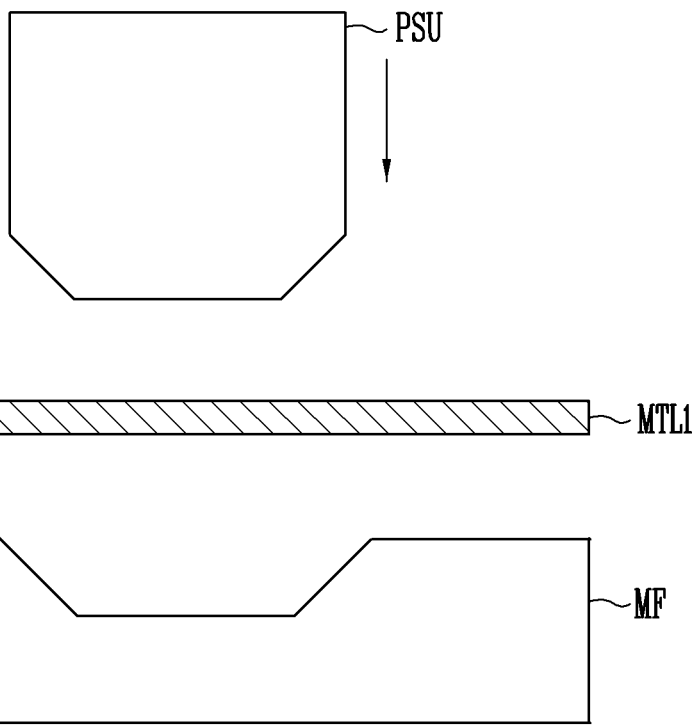
FIGS. 6A and 6B are drawings showing operations in a process of mounting an ultrasonic wave sensor on the display device of FIG. 5.
Figure 6B:
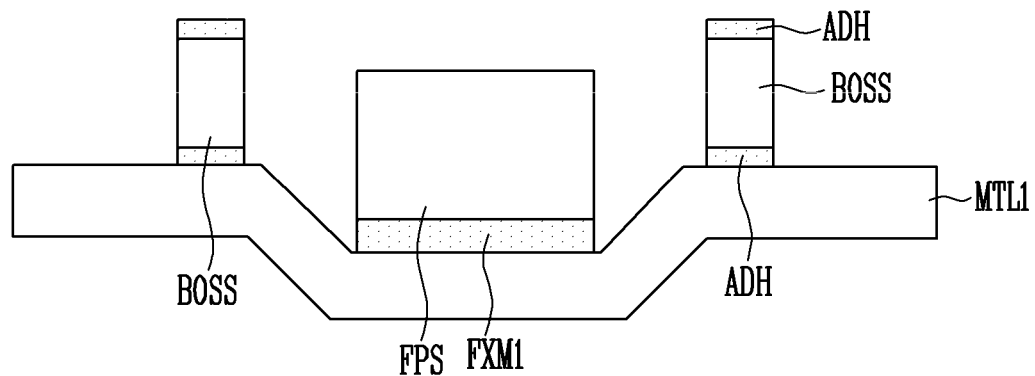

The support member BOSS may be coupled to the lower surface of the display module DM through an adhesive ADH (see FIG. 6B), and may be coupled to the upper surface of the first rigid plate MTL1 through the adhesive ADH (see FIG. 6B). However, the example embodiment is not limited thereto, and for example, the support member BOSS may be coupled to the upper surface of the first rigid plate MTL1 through the adhesive and may not be coupled to the lower surface of the display module DM.

In an example embodiment, the support member BOSS may be coupled to the main body part BDP of the first rigid plate MTL1. In this case, some areas of the display module DM (e.g., area corresponding to the first opening OP1 of the first impact absorption layer CUS1) may be supported by the support member BOSS and the main body part BDP of the first rigid plate MTL1. Therefore, movement of some areas of the display module DM in response to external pressure may be alleviated, and deformation of some areas of the display module DM and an external recognition of some areas of the display module DM in response to external pressure may be alleviated.

The support member BOSS may have a size less (e.g., smaller or narrower) than the first opening OP1 of the first impact absorption layer CUS1, and the support member BOSS may be spaced apart from the first impact absorption layer CUS1 by a reference interval D0, but is not limited thereto. Because the reference interval D0 includes or compensates for size deviation of the support member BOSS, and an alignment error between the first opening OP1 of the first impact absorption layer CUS1 and the support member BOSS, in some embodiments the support member BOSS may have substantially the same size as the first opening OP1 of the first impact absorption layer CUS1, and at least a portion of the support member BOSS may contact the first impact absorption layer CUS1.

The support member BOSS may include a second opening OP2. A width W2 of the second opening OP2 (and a width or diameter of the support member BOSS) may be less than a width W1 of the first opening OP1 of the first impact absorption layer CUS1. In addition, the width W2 of the second opening OP2 may be greater than a width W0 of the fingerprint sensor FPS.

The fingerprint sensor FPS may be disposed on the first rigid plate MTL1, within the second opening OP2 of the support member BOSS. As shown in FIG. 5, the fingerprint sensor FPS may be disposed on the flat portion BTP of the first rigid plate MTL1 (or curve part BEAD).

The fingerprint sensor FPS may be coupled to the upper surface of the first rigid plate MTL1 through the first fixing member FXM1. For example, the first fixing member FXM1 may be a pressure-sensitive adhesive film, but is not limited thereto.

A thickness (or height) of the fingerprint sensor FPS (or a total thickness (or height) H0 of the fingerprint sensor FPS and the first fixing member FXM1) in the third direction DR3 may be greater than a thickness H1 of the first impact absorption layer CUS1. However, the fingerprint sensor FPS may be spaced apart from the lower surface of the display module DM due to the height (vertical position) of the flat portion BTP of the first rigid plate MTL1. For example, the fingerprint sensor FPS may be in a floating state from (e.g., relative to) the display module DM.

The fingerprint sensor FPS may be coupled to the first rigid plate MTL1, and the first rigid plate MTL1 may contact the display module DM through the support member BOSS. In this case, an additional movement path of the ultrasonic wave signal (or ultrasonic wave) emitted from the fingerprint sensor FPS may be provided via the support member BOSS.

For example, the fingerprint sensor FPS may generate a first ultrasonic wave signal USW1 through a vibration, and the first ultrasonic wave signal USW1 may be emitted in the third direction DR3. However, the fingerprint sensor FPS may be coupled to the first rigid plate MTL1, and the first rigid plate MTL1 may be hard or rigid. Accordingly, a second ultrasonic wave signal USW2 due to the vibration of the fingerprint sensor FPS may be propagated through the first rigid plate MTL1 and also through the support member BOSS coupled to the first rigid plate MTL1, and the second ultrasonic wave signal USW2 may be emitted in the third direction DR3. The second ultrasonic wave signal USW2 emitted additionally may compensate for the first ultrasonic wave signal USW1, and may improve the fingerprint sensing capability of the fingerprint sensor FPS.

As described with reference to FIG. 5, the support member BOSS may compensate for a step associated with the first opening OP1 of the first impact absorption layer CUS1, and may transfer a signal of the fingerprint sensor FPS. Therefore, a phenomenon that the fingerprint sensor FPS is visually recognized in the display module DM may be alleviated, and the fingerprint sensing capability of the fingerprint sensor FPS may be improved.

FIGS. 6A and 6B are drawings showing operations in a process of mounting an ultrasonic wave sensor on the display device of FIG. 5.

First, referring to FIG. 6A, the curve part BEAD (see FIG. 5) may be formed at the first rigid plate MTL1 through a forging process.

For example, a mold MF having a shape corresponding to the curve part BEAD (see FIG. 5) may be prepared, and the first rigid plate MTL1 may be provided on the mold MF. Next, the first rigid plate MTL1 may be pressed by a pressurizer PSU having a shape (or pressing portion) corresponding to the curve part BEAD (see FIG. 5).

Next, as shown in FIG. 6B, the support member BOSS may be disposed on the first rigid plate MTL1. The adhesive ADH may be disposed on the upper and lower surfaces of the support member BOSS, and the support member BOSS may be coupled to the upper surface of the first rigid plate MTL1 through the adhesive ADH.

Similarly, the fingerprint sensor FPS may be disposed on the first rigid plate MTL1. The fingerprint sensor FPS may be coupled to the upper surface of the first rigid layer MTL1 through the first fixing member FXM1 interposed between the fingerprint sensor FPS and the first rigid layer MTL1.

The fingerprint sensor FPS may be disposed or formed after the support member BOSS is formed on the first rigid plate MTL1, but the order of formation is not limited thereto. For example, the support member BOSS may be disposed after the fingerprint sensor FPS is disposed on the first rigid plate MTL1.

The first rigid plate MTL1, the support member BOSS, and the fingerprint sensor FPS may form a first structure.

Next, the first structure may be coupled to the display module DM, to which the first impact absorption layer CUS1 including the first opening OP1 is coupled through a lamination process. The first rigid plate MTL1 may be bonded to the first impact absorption layer CUS1 through the adhesive layer PSA disposed under the first impact absorption layer CUS1, and the support member BOSS may be bonded to the lower surface of the display module DM through the adhesive ADH.

Figure 7:
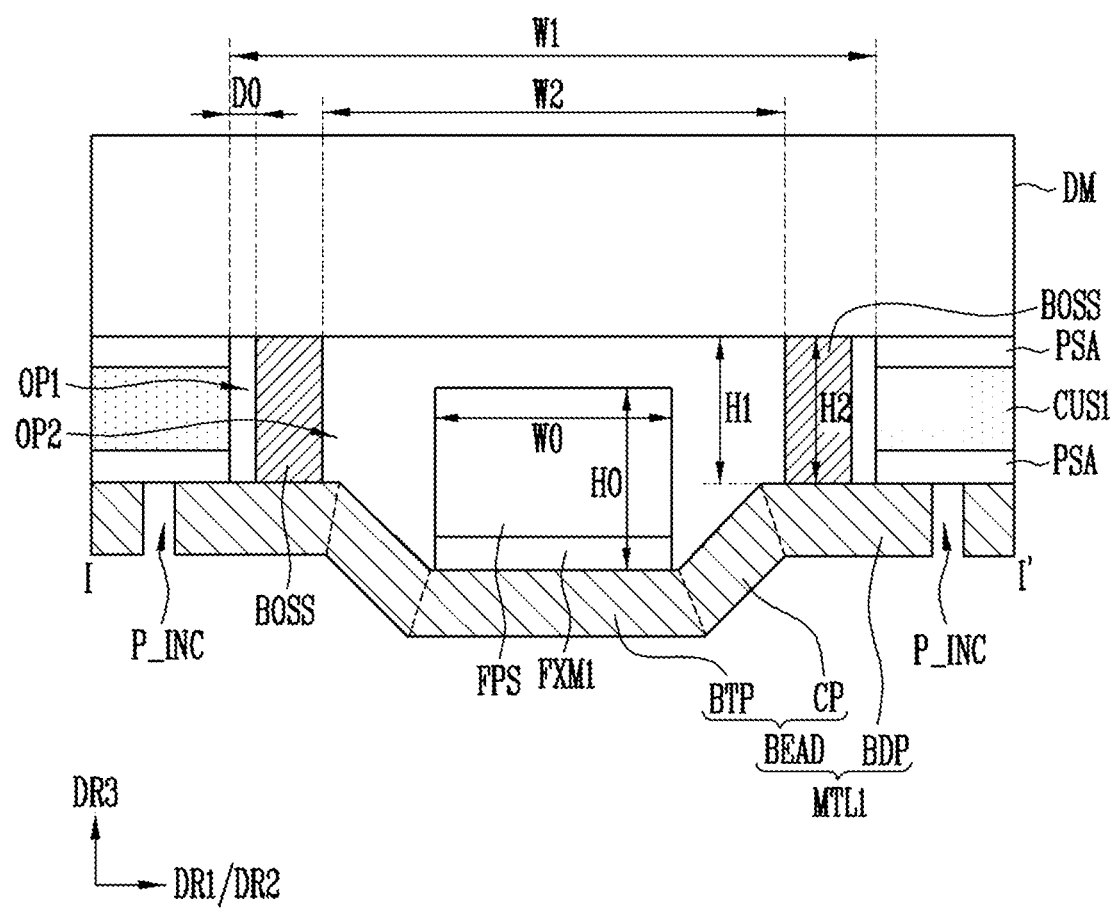
FIG. 7 is a cross-sectional view showing another example of a display device as viewed along line I-I' of FIG. 1A.
Figure 8B:
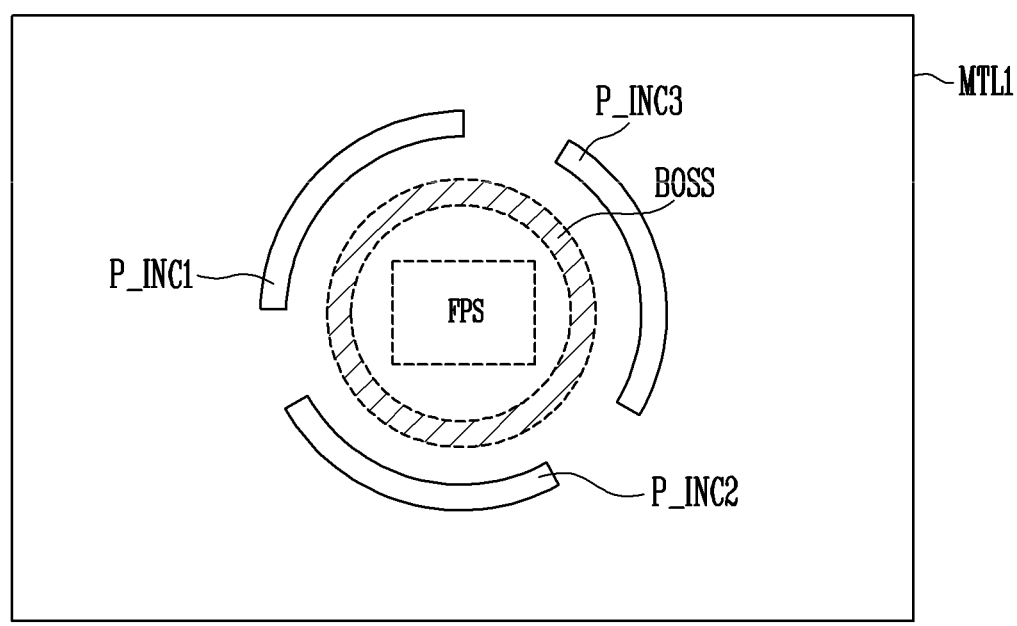
Figure 8C:
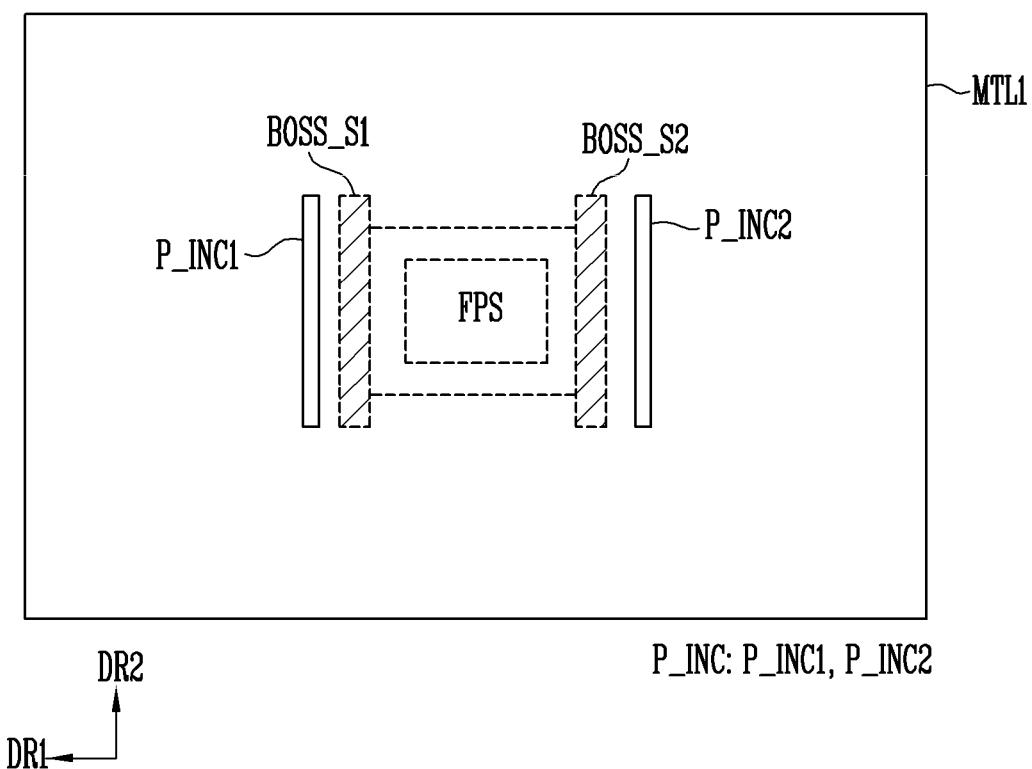

FIG. 7 is a cross-sectional view showing another example of a display device taken along line I-I' of FIG. 1A. FIGS. 8A to 8C are rear views showing an example of the display device of FIG. 7.

Referring to FIGS. 5 and 7, because the display devices DD of FIG. 7 are substantially equivalent or similar to the display device DD of FIG. 5 except for the first rigid plate MTL1, duplicative descriptions will not be provided.

The first rigid plate MTL1 may further include a cutout P_INC. The cutout P_INC may be a cut portion of the first rigid plate MTL1, may have a shape of a slit, and may expose a surface or portion of the first impact absorption layer CUS1. The cutout P_INC may be formed through a laser processing (e.g., laser hole patterning, laser cutting) in the first rigid plate MTL1.

The cutout P_INC may be formed at the main body part BDP of the first rigid plate MTL1, may be further spaced apart from the support member BOSS with respect to the fingerprint sensor FPS (e.g., disposed outside the support member BOSS), and may be further spaced apart from the first opening OP1 of the first impact absorption layer CUS1 (or a side of the first impact absorption layer CUS1) with respect to the fingerprint sensor FPS. The cutout P_INC may overlap with the first impact absorption layer CUS1. In this case, the cutout P_INC may reduce propagation of the second ultrasonic wave signal USW2 described with reference to FIG. 5, in the first direction DR1 (and/or the second direction DR2) through the main body part BDP of the first rigid plate MTL1, and may allow or encourage the second ultrasonic wave signal USW2 to propagate in the third direction DR3 through the support member BOSS.

The cutout P_INC may be formed to correspond to at least a portion of the first opening OP1 of the first impact absorption layer CUS1, or may be formed corresponding to the support member BOSS.

Referring to FIG. 8A, the support member BOSS may have a planar shape of a quadrangle (or rectangular or square ring). In this case, the cutout P_INC may include sub-cutouts P_INC1, P_INC2, P_INC3, and P_INC4 that are disposed corresponding to at least a portion of sides (or side surfaces) of the support member BOSS.

For example, the cutout P_INC may include first to fourth sub-cutouts P_INC1, P_INC2, P_INC3, and P_INC4, and the first to fourth sub-cutouts P_INC1, P_INC2, P_INC3, and P_INC4 may be separated from each other and have a shape of a slit. The first sub-cutout P_INC1 may be disposed adjacent to a left side of the support member BOSS and the second sub-cutout P_INC2 may be disposed adjacent to a right side of the support member BOSS (e.g., in opposing directions along or parallel to the first direction DR1 with respect to the support member BOSS), the third sub-cutout P_INC3 may be disposed adjacent to an upper side of the support member BOSS and the fourth sub-cutout P_INC4 may be disposed adjacent to a lower side of the support member BOSS (e.g., in opposing directions along or parallel to the second direction DR2 with respect to the support member BOSS).

Meanwhile, the first to fourth sub-cutouts P_INC1, P_INC2, P_INC3, and P_INC4 are shown to be separated from each other in FIG. 8A, but are not limited thereto. For example, at least two of first to fourth sub-cutouts P_INC1, P_INC2, P_INC3, and P_INC4 may be connected to each other (e.g., to form a larger composite cutout).

Referring to FIG. 8B, in some embodiments the support member BOSS may have a planar shape of a circular (or circular ring). In this case, the cutout P_INC may include sub-cutouts P_INC1, P_INC2, and P_INC3 that are disposed corresponding to at least a portion of a boundary of the support member BOSS.

For example, the cutout P_INC may include first to third sub-cutouts P_INC1, P_INC2, and P_INC3, and the first to third sub-cutouts P_INC1, P_INC2, and P_INC3 may be separated from each other, and may each have a shape of a circular arc (that together substantially form a donut). The first to third sub-cutouts P_INC1, P_INC2, and P_INC3 may be disposed in different directions, respectively, with respect to the support member BOSS.

Referring to FIG. 8C, in some embodiments the support member BOSS may include sub-support members BOSS_S1 and BOSS_S2, each having a quadrangle planar shape. In this case, the cutout P_INC may include the sub-cutouts P_INC1 and P_INC2 that are disposed corresponding to at least a portion of the sub-support members BOSS_S1 and BOSS_S2.

For example, the support member BOSS may include a first sub-support member BOSS_S1 disposed in the first direction DR1 and a second sub-support member BOSS_S2 disposed in an opposite direction of the first direction DR1 with respect to the fingerprint sensor FPS. The cutout P_INC may include the first and second sub-cutouts P_INC1 and P_INC2 having a shape of a slit, the first sub-cutout P_INC1 may be disposed adjacent to the first sub-support member BOSS_S1, and the second sub-cutout P_INC2 may be disposed adjacent to the second sub-support member BOSS_S2. However, the example embodiment is not limited thereto, and the cutout P_INC may include the first to fourth sub-cutouts P_INC1, P_INC2, P_INC3, and P_INC4 described with reference to FIG. 8A. The support member BOSS and the cutout P_INC shown in FIG. 8C may be applied to a display device DD in which the fingerprint sensor FPS is disposed in the folding area FA (see FIGS. 1B and 2B).

As described with reference to FIGS. 7 to 8C, the first rigid plate MTL1 may include the cutout P_INC formed outside the support member BOSS corresponding to at least a portion of the support member BOSS (or, first opening OP1 of the first impact absorption layer CUS1). Therefore, the strength of the second ultrasonic wave signal USW2 propagated through the support member BOSS may be relatively increased or preserved, and the fingerprint sensing capability of the fingerprint sensor FPS may be improved.

Figure 9A:
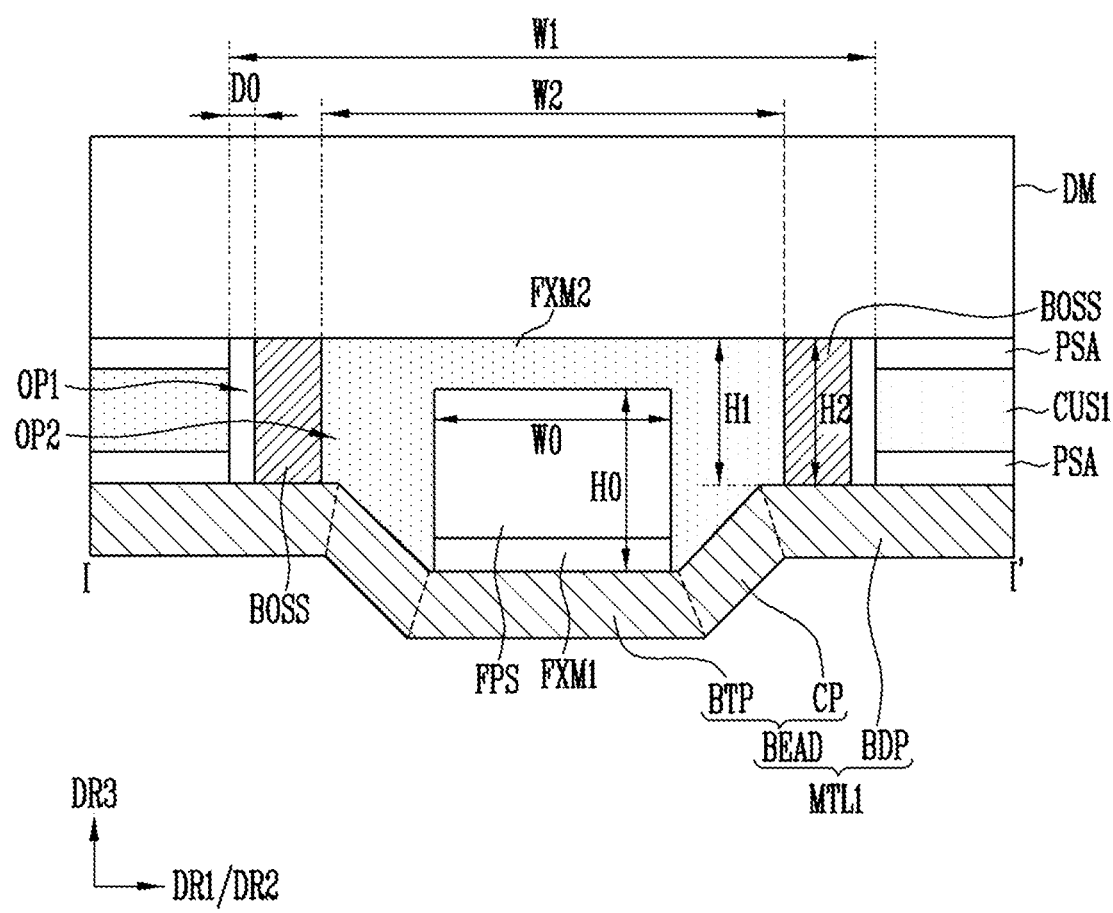
FIG. 9A is a cross-sectional view showing another example of a display device as viewed along line I-I' of FIG. 1A.
Figure 9B:
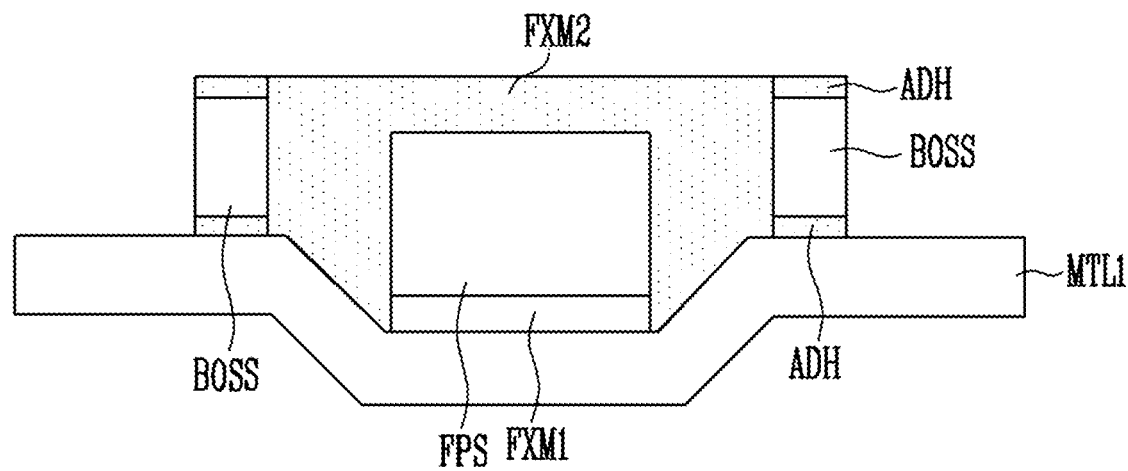
FIG. 9B is a drawing showing an operation in a process of mounting an ultrasonic wave sensor on the display device of FIG. 9A.

FIG. 9A is a cross-sectional view showing another example of a display device taken along line I-I' of FIG. 1A. FIG. 9B is a drawing showing an operation in a process of mounting an ultrasonic wave sensor on the display device of FIG. 9A.

Referring to FIGS. 5 and 9A, the display device DD of FIG. 9A is different from the display device DD of FIG. 5 in that it further includes a second fixing member FXM2. Because the display device DD of FIG. 9A is substantially equivalent or similar to the display device DD of FIG. 5 except for the second fixing member FXM2, duplicate descriptions will not be provided.

The second fixing member FXM2 may be disposed between the display module DM and the fingerprint sensor FPS, within the second opening OP2 of the support member BOSS (or within the first opening OP1 of the first impact absorption layer CUS1).

As shown in FIG. 9B, after the support member BOSS and the fingerprint sensor FPS are disposed on the first rigid plate MTL1, the second fixing member FXM2 may be filled in the second opening OP2 of the support member BOSS.

When the first rigid plate MTL1 (or first structure) on which the support member BOSS and the fingerprint sensor FPS are disposed are coupled to the first impact absorption layer CUS1 and the display module DM, the second fixing member FXM2 may couple the fingerprint sensor FPS to the lower surface of the display module DM.

In an example embodiment, the second fixing member FXM2 may include a thermosetting resin having an adherence due to a chemical reaction by heat. For example, the thermosetting resin may include an epoxy resin, an amino resin, a phenol resin, a polyester resin, and/or the like formed of an organic material.

In an example embodiment, the second fixing member FXM2 may be formed of a photocurable resin including a photopolymerization initiator that is cross-linked and cured by light (such as ultraviolet or UV light).

As shown in FIG. 9B, the second fixing member FXM2 may be subjected to a first curing process (or temporary curing process) after filling in the second opening OP2 of the support member BOSS. After the first rigid plate MTL1 (or first structure) on which the support member BOSS and the fingerprint sensor FPS is disposed is coupled to the first impact absorption layer CUS1 and the display module DM, the second fixing member FXM2 may be subjected to a secondary curing process.

In an example embodiment, a viscosity of the second fixing member FXM2 may be 50 centipoises (cps) or less. In this case, transmission of the first ultrasonic wave signal USW1 (and ultrasonic wave signal reflected by the finger) described with reference to FIG. 5 may be improved.

As described with reference to FIGS. 9A and 9B, a second fixing member FXM2 may be interposed between the display module DM and the fingerprint sensor FPS within the second opening OP2 of the support member BOSS. Therefore, a signal transmission characteristic and a fingerprint sensing capability of the fingerprint sensor FPS may be improved.

Figure 10:
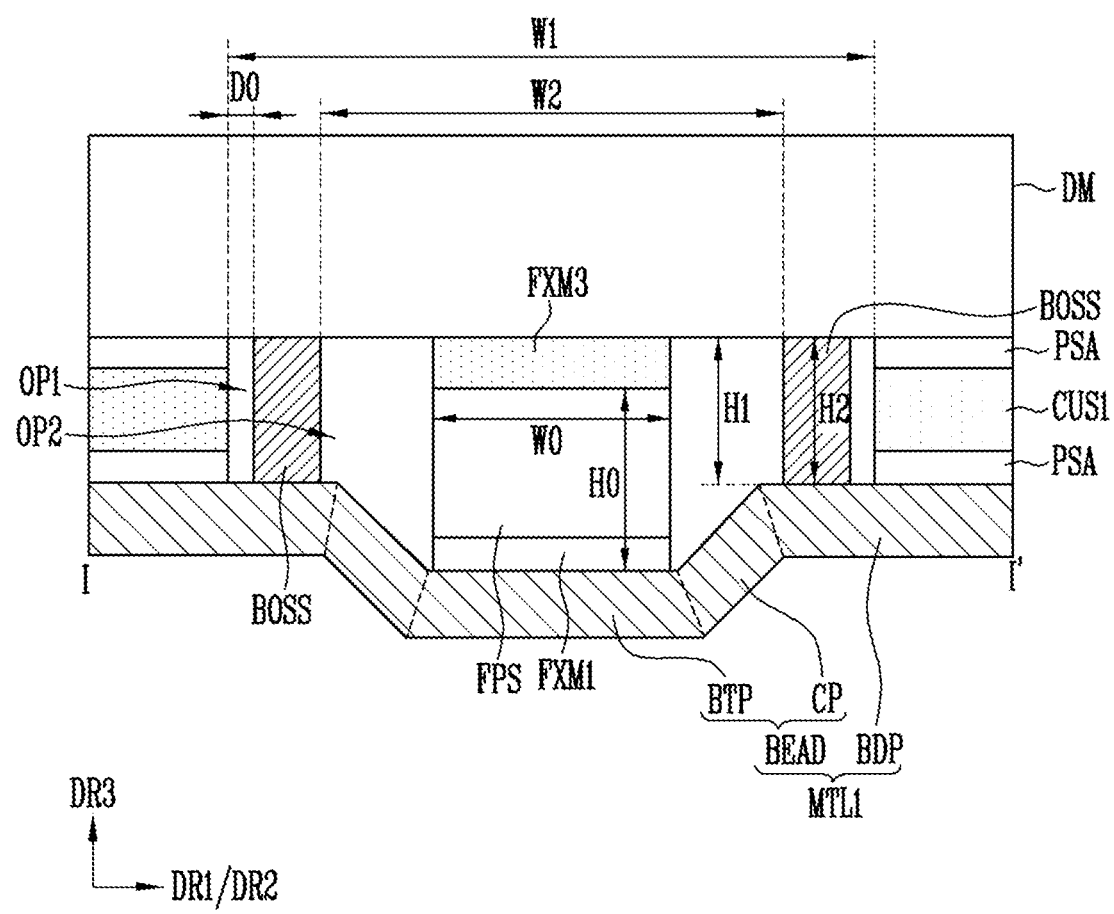
FIG. 10 is a cross-sectional view showing another example of a display device as viewed along line I-I' of FIG. 1A.

FIG. 10 is a cross-sectional view showing another example of a display device taken along line I-I' of FIG. 1A.

Referring to FIGS. 5 and 10, the display device DD of FIG. 10 is different from the display device DD of FIG. 5 in that it further includes the third fixing member FXM3. Because the display device DD of FIG. 10 is substantially equivalent or similar to the display device DD of FIG. 5 except for the third fixing member FXM3, duplicate descriptions will not be provided.

The third fixing member FXM3 may be disposed between the display module DM and the fingerprint sensor FPS within the second opening OP2 of the support member BOSS (or within the first opening OP1 of the first impact absorption layer CUS1).

The third fixing member FXM3 may cover the fingerprint sensor FPS, a width of the third fixing member FXM3 in the first direction DR1 (or second direction DR2) may be less than a width W2 of (e.g., inside) the support member BOSS, and the third fixing member FXM3 may be spaced apart from an inner side of the support member BOSS.

The third fixing member FXM3 may be implemented as a film including polyurethane (PU), thermoplastic polyurethane (TPU), silicon (Si), polydimethylacrylamide (PDMA), and/or the like. In this case, the third fixing member FXM3 may have characteristics such as a high creep, a high elasticity, a high recovery, and/or the like.

The third fixing member FXM3 may support some areas of the display module DM corresponding to the second opening OP2 of the support member BOSS, and may prevent or reduce some areas of the display module DM from being deformed by an external pressure (e.g., finger press by the user's finger).

Figure 11A:
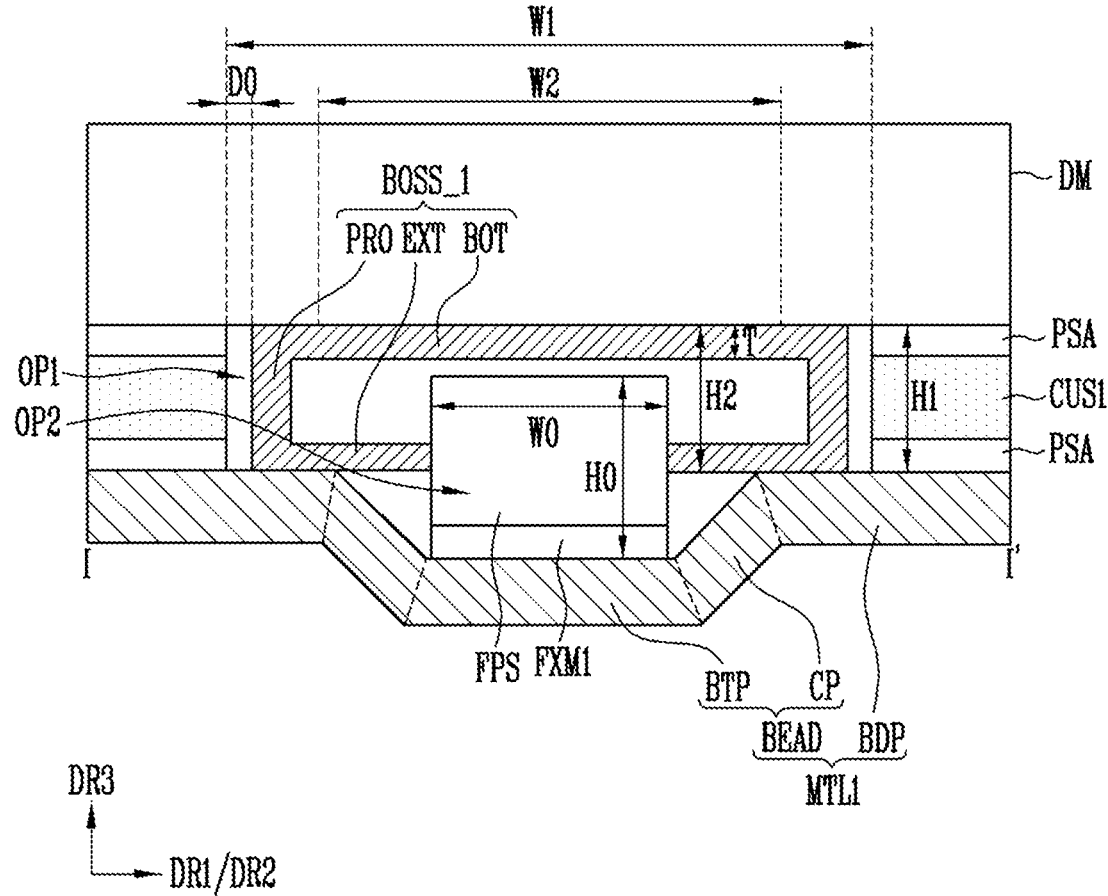
FIG. 11A is a cross-sectional view showing another example of a display device as viewed along line I-I' of FIG. 1A.
Figure 11B:
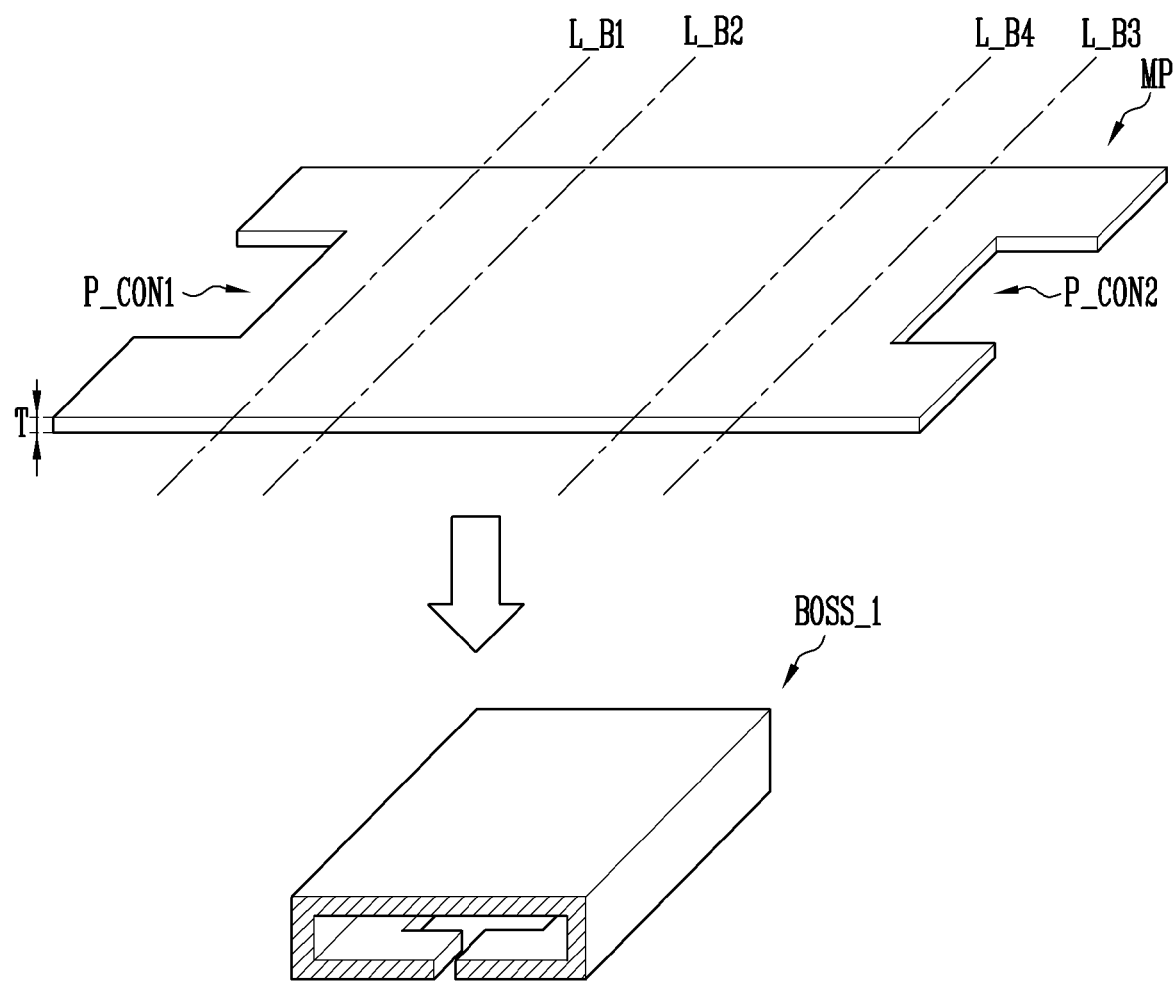
FIG. 11B is a drawing showing an example of a support member included in the display device of FIG. 11A.

FIG. 11A is a cross-sectional view showing another example of a display device taken along line I-I' of FIG. 1A. FIG. 11B is a drawing showing an example of a support member included in a display device of FIG. 11A. FIG. 11C is a rear view showing an example of a display device of FIG. 11A.

Referring to FIGS. 5 and 11A, the display device DD of FIG. 11A is substantially equivalent or similar to the display device DD of FIG. 5 except for the support member BOSS_1. Therefore, duplicate descriptions will not be provided.

The support member BOSS_1 may include a bottom (e.g., base) portion BOT, a protruding portion PRO, and an extending portion EXT. For example, the support member BOSS_1 may have a cross-sectional shape that may be described as a lying down "C" (e.g., a rectangular frame having the shape of a C-clamp with the opening facing the fingerprint sensor FPS and the rigid plate MTL, and for example, with the opening being placed around the fingerprint sensor FPS).

The bottom portion BOT may have a set or predetermined thickness "T" and a generally flat surface, and may have an area equal to or similar to that of the first opening OP1 of the first impact absorption layer CUS1. The bottom portion BOT may contact the lower surface of the display module DM, and may be coupled to the lower surface of the display module DM through a separate adhesive layer.

The protruding portion PRO may extend from at least a portion of the boundary of the bottom portion BOT in the third direction DR3. A height of the protruding portion PRO (i.e., thickness H2 of the protruding portion PRO protruding from the support member BOSS) may be equal to a thickness H1 of the first impact absorption layer CUS1.

The extending portion EXT may extend from an end of the protruding portion PRO toward the fingerprint sensor FPS, and may be parallel to the bottom portion BOT. The extending portion EXT may contact a side of the fingerprint sensor FPS, but is not limited thereto.

A portion of the lower side of the extending portion EXT may contact the main body part BDP of the first rigid plate MTL1. In this case, some areas of the display module DM may be supported by the main body part BDP of the first rigid plate MTL1 through the bottom portion BOT, the protruding portion PRO, and the extending portion EXT (or portion of the extending portion EXT) of the support member BOSS_1.

In an example embodiment, the support member BOSS_1 may be manufactured through a bending process applied to a plate member MP.

Referring to FIG. 11B, the plate member MP has a set or predetermined thickness T and may have a quadrangle (e.g., substantially rectangular) planar shape (e.g., prior to the bending process). In addition, first and second recess portions P_CON1 and P_CON2 may be formed at both ends of the plate member MP. The first and second recess portions P_CON1 and P_CON2 may have a shape corresponding to a planar shape of the fingerprint sensor FPS. For example, the first and second recess portions P_CON1 and P_CON2 may each have a quadrangle (rectangular) planar shape, a semicircle shape, and/or the like. However, the example embodiment is not limited thereto, and the plate member MP may include only one selected from the first and second recess portions P_CON1 and P_CON2, or in some embodiments may not include the recess portion.

The plate member MP may be bent along the first to fourth reference lines L_B1, L_B2, L_B3, and L_B4 to become the support member BOSS_1, as shown in the lower portion of FIG. 11 B.

Referring to FIG. 11C, the support member BOSS_1 (or the extending portion EXT and the first and second recess portions P_CON1 and P_CON2 of the support member BOSS_1) may be in contact with the fingerprint sensor FPS. In this case, a vibration (or ultrasonic wave signal) generated from the fingerprint sensor FPS may be propagated in the third direction DR3 through a side of the fingerprint sensor FPS, the extending portion EXT, and the protruding portion PRO. Therefore, the fingerprint sensing capability of the fingerprint sensor FPS may be improved.

The extending portions of the support member BOSS_1 are shown to be spaced apart from each other, but are not limited thereto, and for example, the extending portions may be in contact with each other.

As shown in FIG. 11C, the first rigid plate MTL1 may include a structure substantially similar to the cutout P_INC described with reference to FIG. 8C, (i.e., first and second sub-cutouts P_INC1 and P_INC2). In this case, the transmission of the ultrasonic wave signal of the fingerprint sensor FPS may be further improved, and the sensing capability of the fingerprint sensor FPS may be further improved.

As described with reference to FIGS. 11A to 11C, the support member BOSS_1 may include a bottom portion BOT and a protruding portion PRO. Therefore, most of the areas of the display module DM corresponding to the first opening OP1 of the first impact absorption layer CUS1 may be supported by the bottom portion BOT and the protruding portion PRO, and deformation of these areas may be prevented or reduced.

In some embodiments, the support member BOSS_1 may further include an extending portion EXT that extends from an end of the protruding portion PRO and contacts the side surface of the fingerprint sensor FPS. Therefore, a portion of the ultrasonic wave signal of the fingerprint sensor FPS may be transmitted through the extending portion EXT and the protruding portion PRO, and the fingerprint sensing capability of the fingerprint sensor FPS may be improved.

Meanwhile, the support member BOSS_1 is shown to include the extending portion EXT in FIG. 11A to 11C, but the support member BOSS_1 is not limited thereto. For example, the support member BOSS_1 may include only the bottom portion BOT and the protruding portion PRO, and may not include the extending portion EXT.

Figure 12:
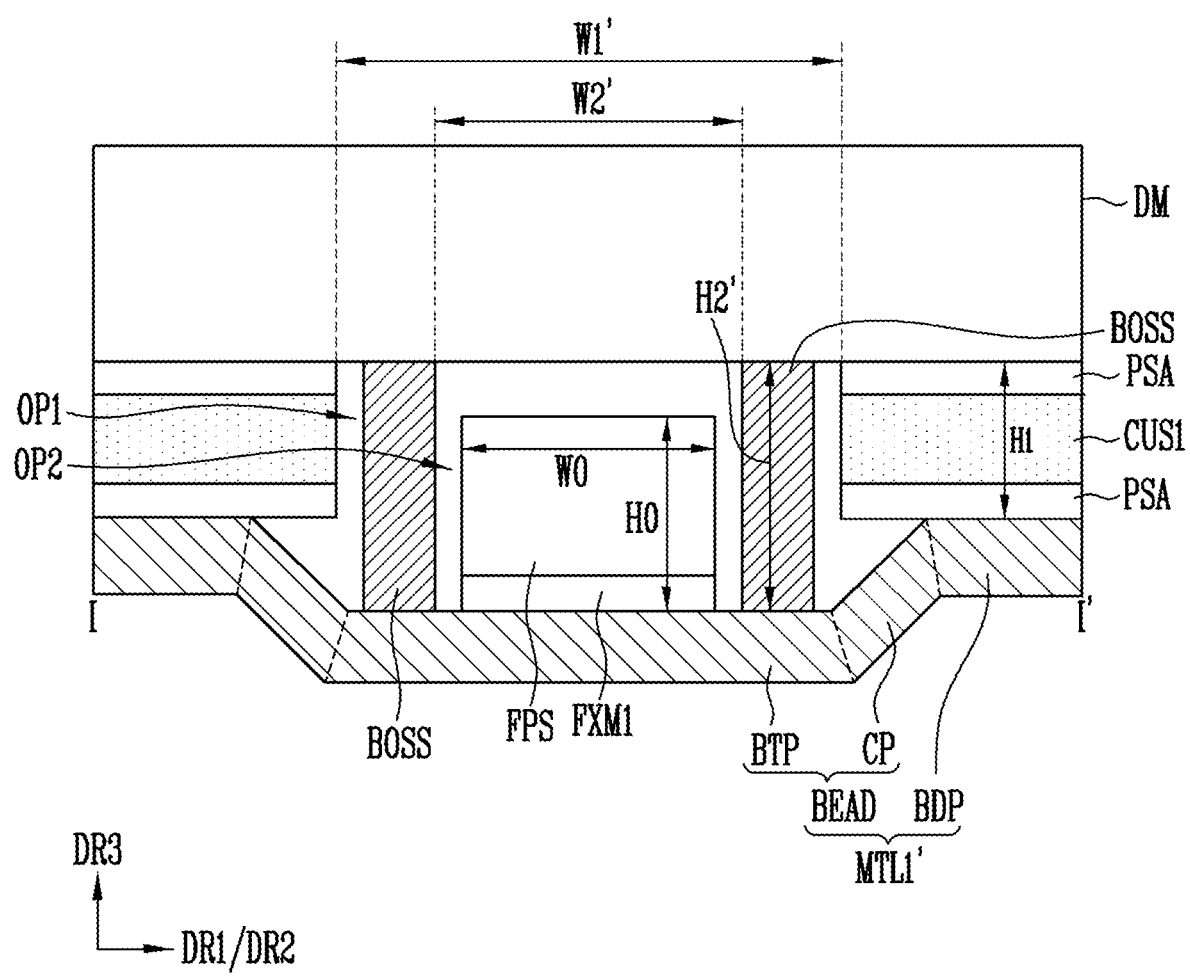
FIG. 12 is a cross-sectional view showing another example of a display device as viewed along line I-I' of FIG. 1A.

FIG. 12 is a cross-sectional view showing another example of a display device taken along line I-I' of FIG. 1A.

Referring to FIGS. 5 and 12, because the display device DD of FIG. 12 is substantially equivalent or similar to the display device DD of FIG. 5 except for the first rigid plate MTL1' and the support member BOSS, duplicate descriptions will not be provided.

The first rigid plate MTL1' may include the main body part BDP and the curve part BEAD, and the curve part BEAD may include the flat portion BTP and the connecting portion CP (or inclined portion). Because the main body part BDP, the flat portion BTP and the connecting portion CP of FIG. 12 are substantially equivalent or similar to the main body part BDP, the flat portion BTP, and the connecting portion CP described with reference to FIG. 5, the duplicate descriptions will not be provided.

An area (or size, width) of the flat portion BTP of the first rigid plate MTL1' may be equal to or greater than an area (or size, width) of the support member BOSS.

A thickness H2' of the support member BOSS may be greater than a thickness of the first impact absorption layer CUS1 (or a total thickness H1 of the first impact absorption layer CUS1 and the adhesion layer PSA).

In this case, the support member BOSS may be coupled to the flat portion BTP of the first rigid plate MTL1'. The support member BOSS described with reference to FIG. 5 may be supported by the main body part BDP of the first rigid plate MTL1, and the support member BOSS shown in FIG. 12 may be supported by the flat portion BTP of the first rigid plate MTL1'.

In some embodiments, when the first rigid plate MTL1' includes the cutout P_INC described with reference to FIG. 7, the cutout P_INC may be formed in the connecting portion CP instead of the main body part BDP.

Figure 13:
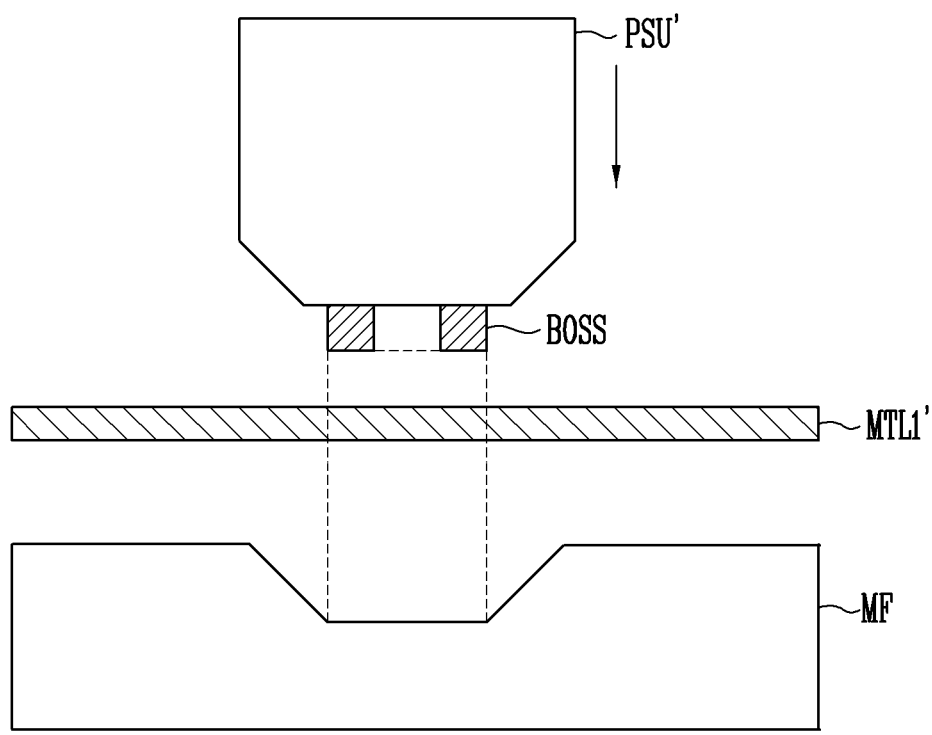
FIG. 13 is a drawing showing an operation in a process of mounting a support member on the display device of FIG. 12.

FIG. 13 is a drawing showing an operation in a process of mounting a support member on the display device of FIG. 12.

Referring to FIG. 13, the mold MF having a shape corresponding to the support member BOSS and the curve part BEAD (see FIG. 12) may be prepared, and the first rigid plate MTL1' may be provided on the mold MF. In addition, the support member BOSS may be disposed on the pressurizer PSU'.

Next, the first rigid plate MTL1' may be pressed by the pressurizer PSU' and the support member BOSS. When the support member BOSS and the first rigid plate MTL1' include the same material, the support member BOSS may be coupled to the first rigid plate MTL1' due to the pressure and heat of the pressurizer PSU'.

Next, as described with reference to FIG. 6B, similarly, the fingerprint sensor FPS may be disposed on the first rigid plate MTL1', the first rigid plate MTL1' may be coupled to the first impact absorption layer CUS1 through a lamination process, or the like, and then, the display devices DD of FIG. 12 may be manufactured.

As used herein, expressions such as "at least one of", "one of", and "selected from", when preceding a list of elements, modify the entire list of elements and do not modify the individual elements of the list. Further, the use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art.

The technical scope of the present disclosure may be determined by the technical scope of the accompanying claims. In addition, all changes or modifications that come within the meaning and range of the claims and their equivalents will be interpreted as being included within the range of the present disclosure

What is claimed is:

1. A display device comprising:
  a display module;
  an impact absorption layer under the display module, the impact absorption layer comprising a first opening exposing a lower surface of the display module;
  a rigid plate under the impact absorption layer;
  a sensor between the display module and the rigid plate within the first opening, the sensor being coupled to an upper surface of the rigid plate; and
  a support member between the impact absorption layer and the sensor within the first opening, the support member contacting the display module and the rigid plate.

2. The display device of claim 1, wherein the sensor is spaced apart from the display module.

3. The display device of claim 1, wherein the support member and the rigid plate comprise a same material.

4. The display device of claim 1, wherein the support member has a planar shape of a circular ring or a square ring.

5. The display device of claim 1, wherein the rigid plate comprises a main body part overlapping with the impact absorption layer and a curve part overlapping with the sensor,
  the curve part comprises a flat portion having a height different from a height of the main body part with respect to a surface of the display module, and a connecting portion inclined with the main body part and extending from the main body part to the flat portion, and
  the support member contacts the main body part.

6. The display device of claim 5, wherein a thickness of the connecting portion is less than an average thickness of the main body part.

7. The display device of claim 1, wherein the rigid plate has a cutout formed on an outside of the support member with respect to the sensor, and the cutout overlaps the impact absorption layer.

8. The display device of claim 7, wherein the cutout has a planar shape corresponding to a planar shape of the support member, and a plurality of sub-cutouts separated from each other.

9. The display device of claim 8, wherein the support member is around at least a portion of the sensor and comprises a plurality of sub-support members separated from each other in a plan view, and
  the sub-cutouts are formed in correspondence with the sub-support members respectively.

10. The display device of claim 1, further comprising:
  a fixing member between the display module and the sensor,
  wherein the fixing member comprises at least one selected from a thermosetting resin and a photocurable resin.

11. The display device of claim 1, further comprising:
  a fixing member between the display module and the sensor,
  wherein the fixing member comprises at least one selected from polyurethane, thermoplastic polyurethane, silicone, and polydimethylacrylamide.

12. The display device of claim 1, wherein the support member comprises:
  a bottom portion parallel to a lower surface of the display module; and
  a protruding portion extending downward from an end of the bottom portion,
  wherein the bottom portion contacts the lower surface of the display module, and
  wherein the protruding portion is coupled to the rigid plate.

13. The display device of claim 12, wherein the support member further comprises an extending portion extending from a lower end of the protruding portion toward the sensor, and
  wherein the extending portion contacts the sensor.

14. The display device of claim 13, wherein the support member is manufactured by bending a plate member and comprises a recess portion corresponding to a planar shape of the sensor.

15. The display device of claim 14, wherein the rigid plate comprises a cutout formed adjacent to the protruding portion, and
  wherein the cutout overlaps the impact absorption layer.

16. The display device of claim 1, wherein the rigid plate comprises a main body part overlapping with the impact absorption layer and a curve part overlapping with the sensor, the curve part comprises a flat portion having a height different from a height of the main body part with respect to a surface of the display module, and a connecting portion inclined with the main body part and extending from the main body part to the flat portion, the support member contacts the flat portion, and wherein the rigid plate and the support member are integrally formed.

17. The display device of claim 1, wherein the sensor includes an ultrasonic wave sensor, a light sensor, and an infrared sensor.

18. A display device comprising:

a display module comprising first and second non-folding areas and a folding area between the first and second non-folding areas;

first and second impact absorption layers respectively under the first and second non-folding areas of the display module;

a rigid plate comprising first and second sub-rigid plates respectively under the first and second impact absorption layers;

a sensor between the folding area of the display module and the rigid plate and coupled to an upper surface of the rigid plate; and a support member between the first and second impact absorption layers and around the sensor in a plan view.

19. The display device of claim 18, wherein the rigid plate comprises a main body part overlapping with the first and second impact absorption layers and a curve part overlapping with the sensor, the curve part comprises a flat portion having a height different from a height of the main body part with respect to a surface of the display module, and a connecting portion inclined with the main body part and extending from the main body part to the flat portion, and the support member contacts the main body part.

20. The display device of claim 19, wherein the support member comprises:

a first sub-support member between the first impact absorption layer and the sensor; and a second sub-support member between the second impact absorption layer and the sensor.

* * * * *